(12) United States Patent
Duan et al.

(10) Patent No.: US 11,678,211 B2
(45) Date of Patent: Jun. 13, 2023

(54) PARTIAL MEASUREMENT OF REFERENCE SIGNAL FOR POSITIONING RESOURCE

(71) Applicant: QUALCOMM Incorporated, San Diego, CA (US)

(72) Inventors: Weimin Duan, San Diego, CA (US); Alexandros Manolakos, Escondido, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/243,281

(22) Filed: Apr. 28, 2021

(65) Prior Publication Data

US 2022/0353718 A1 Nov. 3, 2022

(51) Int. Cl.
*H04W 24/10* (2009.01)
*H04L 5/00* (2006.01)

(52) U.S. Cl.
CPC ........... *H04W 24/10* (2013.01); *H04L 5/0051* (2013.01)

(58) Field of Classification Search
CPC ............................. H04W 24/10; H04L 5/0051
See application file for complete search history.

(56) References Cited

U.S. PATENT DOCUMENTS

| 9,544,725 | B2 * | 1/2017 | Han | G01S 1/20 |
| 2012/0027110 | A1 * | 2/2012 | Han | H04L 27/2613 |
| | | | | 375/260 |
| 2014/0009336 | A1 | 1/2014 | Ruegamer et al. | |
| 2015/0226857 | A1 | 8/2015 | Davies | |
| 2019/0319827 | A1 * | 10/2019 | Opshaug | H04L 5/0053 |
| 2020/0351813 | A1 * | 11/2020 | Manolakos | G01S 5/0244 |
| 2021/0014644 | A1 * | 1/2021 | Wu | G01S 5/0036 |
| 2021/0109188 | A1 | 4/2021 | Kumar et al. | |
| 2022/0140878 | A1 * | 5/2022 | Zhu | H04B 7/088 |
| | | | | 370/252 |

FOREIGN PATENT DOCUMENTS

| GB | 2596073 A | * | 12/2021 | ............ B61L 25/025 |
| WO | WO-2021030583 A1 | * | 2/2021 | ........... G01S 5/0072 |
| WO | WO-2022081125 A1 | * | 4/2022 | |

OTHER PUBLICATIONS

International Search Report and Written Opinion—PCT/US2022/071537—ISA/EPO—dated Jul. 8, 2022.

(Continued)

*Primary Examiner* — Deepa Belur
(74) *Attorney, Agent, or Firm* — QUALCOMM Incorporated

(57) ABSTRACT

In an aspect, a wireless node (e.g., UE, gNB) performs a partial measurement of a measurement type (e.g., RSTD, Rx-Tx, etc.) of a reference signal for positioning (RS-P) resource (e.g., PRS, SRS) that includes multiple symbols, the partial measurement being measured across a subset of the multiple symbols. The wireless node transmits a measurement report that includes an indication of the first partial measurement. The communications device receives the measurement report, and determines whether a spoofing attack is associated with the RS-P based at least in part upon the measurement report.

30 Claims, 21 Drawing Sheets

(56) References Cited

OTHER PUBLICATIONS

Mediatek Inc: "Downlink RS Design for NR Positioning", 3GPP Draft, 3GPP TSG-RAN WG1 #99 Meeting, R1-1912112, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 24, 2019, Nov. 9, 2019 (Nov. 9, 2019), XP051823205, 7 Pages, Retrieved from the Internet: URL: https://ftp.3gpp.org/tsg_ran/WG1_RL1/TSGR1_99/Docs/R1-1912112.zip. R1-1912112 DLRS Design Final.docx [Retrieved Nov. 9, 2019] Sections 2a and 2b.

* cited by examiner

750 →

Comb-2 with 12 symbols

760 →

Comb-4 with 12 symbols

Comb-2 with 6 symbols

770 ↗

Comb-6 with 12 symbols

780 ↗

PARTIAL MEASUREMENT OF REFERENCE SIGNAL FOR POSITIONING RESOURCE

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a wireless node includes performing a first partial measurement of a first measurement type of a reference signal for positioning (RS-P) resource that includes multiple symbols, the first partial measurement being measured across a first subset of the multiple symbols; and transmitting a measurement report that includes an indication of the first partial measurement.

In some aspects, the first subset of symbols includes two or more contiguous symbols that begin at an initial symbol of the RS-P resource.

In some aspects, the method includes performing a full measurement of the first measurement type of the RS-P resource, the full measurement being measured across all symbols of the RS-P resource.

In some aspects, the measurement report includes indications of both the first partial measurement and the full measurement.

In some aspects, indications of the first partial measurement and the full measurement are transmitted via separate measurement reports.

In some aspects, the first subset of symbols includes two or more contiguous symbols that begin at a starting symbol that is later than an initial symbol of the RS-P resource.

In some aspects, the method includes performing a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are transmitted via separate measurement reports.

In some aspects, the method includes determining whether a spoofing attack is associated with the RS-P based at least in part upon the first partial measurement.

In some aspects, the method includes performing at least one additional partial measurement of a second measurement type of the RS-P resource, the at least one additional partial measurement being measured across at least one subset of symbols of the multiple symbols; and transmitting at least one additional measurement report that includes at least one additional indication of the at least one additional partial measurement.

In some aspects, partial measurements of the first measurement type are performed for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is transmitted in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

In an aspect, a method of operating a communications device includes receiving, from a wireless node, a measurement report that includes an indication of a first partial measurement of a first measurement type of a reference signal for positioning (RS-P) resource that includes multiple symbols, the first partial measurement being measured by the wireless node across a first subset of the multiple symbols; and determining whether a spoofing attack is associated with the RS-P based at least in part upon the measurement report.

In some aspects, the first subset of symbols includes two or more contiguous symbols that begin at an initial symbol of the RS-P resource.

In some aspects, the measurement report or a separate measurement report includes a full measurement of the first measurement type of the RS-P resource, the full measurement being measured by the wireless node across all symbols of the RS-P resource.

In some aspects, the measurement report includes indications of both the first partial measurement and the full measurement.

In some aspects, indications of the first partial measurement and the full measurement are received via the measurement report and the separate measurement report, respectively.

In some aspects, the first subset of symbols includes two or more contiguous symbols that begin at a starting symbol that is later than an initial symbol of the RS-P resource.

In some aspects, the measurement report or a separate measurement report includes an indication of a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are received via the measurement report and the separate measurement report, respectively.

In some aspects, the method includes receiving at least one additional measurement report comprising at least one additional indication of at least one additional partial measurement of a second measurement type of the RS-P resource, the at least one additional partial measurement being measured by the wireless node across at least one subset of symbols of the multiple symbols.

In some aspects, partial measurements of the first measurement type are performed by the wireless node for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is received in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

In an aspect, a wireless node includes a memory; a communication interface; and at least one processor communicatively coupled to the memory and the communication interface, the at least one processor configured to: perform a first partial measurement of a first measurement type of a reference signal for positioning (RS-P) resource that includes multiple symbols, the first partial measurement being measured across a first subset of the multiple symbols; and cause the communication interface to transmit a measurement report that includes an indication of the first partial measurement.

In some aspects, the first subset of symbols includes two or more contiguous symbols that begin at an initial symbol of the RS-P resource.

In some aspects, the at least one processor is further configured to: perform a full measurement of the first measurement type of the RS-P resource, the full measurement being measured across all symbols of the RS-P resource.

In some aspects, the measurement report includes indications of both the first partial measurement and the full measurement.

In some aspects, indications of the first partial measurement and the full measurement are transmitted via separate measurement reports.

In some aspects, the first subset of symbols includes two or more contiguous symbols that begin at a starting symbol that is later than an initial symbol of the RS-P resource.

In some aspects, the at least one processor is further configured to: perform a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are transmitted via separate measurement reports.

In some aspects, the at least one processor is further configured to: determine whether a spoofing attack is associated with the RS-P based at least in part upon the first partial measurement.

In some aspects, the at least one processor is further configured to: perform at least one additional partial measurement of a second measurement type of the RS-P resource, the at least one additional partial measurement being measured across at least one subset of symbols of the multiple symbols; and cause the communication interface to transmit at least one additional measurement report that includes at least one additional indication of the at least one additional partial measurement.

In some aspects, partial measurements of the first measurement type are performed for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is transmitted in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

In an aspect, a communications device includes a memory; a communication interface; and at least one processor communicatively coupled to the memory and the communication interface, the at least one processor configured to: receive, via the communication interface, from a wireless node, a measurement report that includes an indication of a first partial measurement of a first measurement type of a reference signal for positioning (RS-P) resource that includes multiple symbols, the first partial measurement being measured by the wireless node across a first subset of the multiple symbols; and determine whether a spoofing attack is associated with the RS-P based at least in part upon the measurement report.

In some aspects, the first subset of symbols includes two or more contiguous symbols that begin at an initial symbol of the RS-P resource.

In some aspects, the measurement report or a separate measurement report includes a full measurement of the first measurement type of the RS-P resource, the full measurement being measured by the wireless node across all symbols of the RS-P resource.

In some aspects, the measurement report includes indications of both the first partial measurement and the full measurement.

In some aspects, indications of the first partial measurement and the full measurement are received via the measurement report and the separate measurement report, respectively.

In some aspects, the first subset of symbols includes two or more contiguous symbols that begin at a starting symbol that is later than an initial symbol of the RS-P resource.

In some aspects, the measurement report or a separate measurement report includes an indication of a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are received via the measurement report and the separate measurement report, respectively.

In some aspects, the at least one processor is further configured to: receive, via the communication interface, at least one additional measurement report comprising at least one additional indication of at least one additional partial measurement of a second measurement type of the RS-P resource, the at least one additional partial measurement being measured by the wireless node across at least one subset of symbols of the multiple symbols.

In some aspects, partial measurements of the first measurement type are performed by the wireless node for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is received in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

In an aspect, a wireless node includes means for performing a first partial measurement of a first measurement type of a reference signal for positioning (RS-P) resource that includes multiple symbols, the first partial measurement being measured across a first subset of the multiple symbols; and means for transmitting a measurement report that includes an indication of the first partial measurement.

In some aspects, the first subset of symbols includes two or more contiguous symbols that begin at an initial symbol of the RS-P resource.

In some aspects, the method includes means for performing a full measurement of the first measurement type of the RS-P resource, the full measurement being measured across all symbols of the RS-P resource.

In some aspects, the measurement report includes indications of both the first partial measurement and the full measurement.

In some aspects, indications of the first partial measurement and the full measurement are transmitted via separate measurement reports.

In some aspects, the first subset of symbols includes two or more contiguous symbols that begin at a starting symbol that is later than an initial symbol of the RS-P resource.

In some aspects, the method includes means for performing a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are transmitted via separate measurement reports.

In some aspects, the method includes means for determining whether a spoofing attack is associated with the RS-P based at least in part upon the first partial measurement.

In some aspects, the method includes means for performing at least one additional partial measurement of a second measurement type of the RS-P resource, the at least one additional partial measurement being measured across at least one subset of symbols of the multiple symbols; and means for transmitting at least one additional measurement report that includes at least one additional indication of the at least one additional partial measurement.

In some aspects, partial measurements of the first measurement type are performed for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is transmitted in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

In an aspect, a communications device includes means for receiving, from a wireless node, a measurement report that includes an indication of a first partial measurement of a first measurement type of a reference signal for positioning (RS-P) resource that includes multiple symbols, the first partial measurement being measured by the wireless node across a first subset of the multiple symbols; and means for determining whether a spoofing attack is associated with the RS-P based at least in part upon the measurement report.

In some aspects, the first subset of symbols includes two or more contiguous symbols that begin at an initial symbol of the RS-P resource.

In some aspects, the measurement report or a separate measurement report includes a full measurement of the first measurement type of the RS-P resource, the full measurement being measured by the wireless node across all symbols of the RS-P resource.

In some aspects, the measurement report includes indications of both the first partial measurement and the full measurement.

In some aspects, indications of the first partial measurement and the full measurement are received via the measurement report and the separate measurement report, respectively.

In some aspects, the first subset of symbols includes two or more contiguous symbols that begin at a starting symbol that is later than an initial symbol of the RS-P resource.

In some aspects, the measurement report or a separate measurement report includes an indication of a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are received via the measurement report and the separate measurement report, respectively.

In some aspects, the method includes means for receiving at least one additional measurement report comprising at least one additional indication of at least one additional partial measurement of a second measurement type of the RS-P resource, the at least one additional partial measurement being measured by the wireless node across at least one subset of symbols of the multiple symbols.

In some aspects, partial measurements of the first measurement type are performed by the wireless node for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is received in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

In an aspect, a non-transitory computer-readable medium storing computer-executable instructions that, when executed by a wireless node, cause the wireless node to: perform a first partial measurement of a first measurement type of a reference signal for positioning (RS-P) resource that includes multiple symbols, the first partial measurement being measured across a first subset of the multiple symbols; and transmit a measurement report that includes an indication of the first partial measurement.

In some aspects, the first subset of symbols includes two or more contiguous symbols that begin at an initial symbol of the RS-P resource.

In some aspects, the one or more instructions further cause the wireless node to: perform a full measurement of the first measurement type of the RS-P resource, the full measurement being measured across all symbols of the RS-P resource.

In some aspects, the measurement report includes indications of both the first partial measurement and the full measurement.

In some aspects, indications of the first partial measurement and the full measurement are transmitted via separate measurement reports.

In some aspects, the first subset of symbols includes two or more contiguous symbols that begin at a starting symbol that is later than an initial symbol of the RS-P resource.

In some aspects, the one or more instructions further cause the wireless node to: perform a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are transmitted via separate measurement reports.

In some aspects, the one or more instructions further cause the wireless node to: determine whether a spoofing attack is associated with the RS-P based at least in part upon the first partial measurement.

In some aspects, the one or more instructions further cause the wireless node to: perform at least one additional partial measurement of a second measurement type of the RS-P resource, the at least one additional partial measurement being measured across at least one subset of symbols of the multiple symbols; and transmit at least one additional measurement report that includes at least one additional indication of the at least one additional partial measurement.

In some aspects, partial measurements of the first measurement type are performed for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is transmitted in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

In an aspect, a non-transitory computer-readable medium storing computer-executable instructions that, when executed by a communications device, cause the communications device to: receive, from a wireless node, a measurement report that includes an indication of a first partial measurement of a first measurement type of a reference signal for positioning (RS-P) resource that includes multiple symbols, the first partial measurement being measured by the wireless node across a first subset of the multiple symbols; and determine whether a spoofing attack is associated with the RS-P based at least in part upon the measurement report.

In some aspects, the first subset of symbols includes two or more contiguous symbols that begin at an initial symbol of the RS-P resource.

In some aspects, the measurement report or a separate measurement report includes a full measurement of the first measurement type of the RS-P resource, the full measurement being measured by the wireless node across all symbols of the RS-P resource.

In some aspects, the measurement report includes indications of both the first partial measurement and the full measurement.

In some aspects, indications of the first partial measurement and the full measurement are received via the measurement report and the separate measurement report, respectively.

In some aspects, the first subset of symbols includes two or more contiguous symbols that begin at a starting symbol that is later than an initial symbol of the RS-P resource.

In some aspects, the measurement report or a separate measurement report includes an indication of a second partial measurement of the first measurement type of the RS-P, the second partial measurement being measured across a second subset of the multiple symbols, the second subset of symbols being different than the first subset of symbols.

In some aspects, a number of the first subset of symbols is the same as a number of the second subset of symbols.

In some aspects, a number of the first subset of symbols is different than a number of the second subset of symbols.

In some aspects, the measurement report includes indications of both the first partial measurement and the second partial measurement.

In some aspects, indications of the first partial measurement and the second partial measurement are received via the measurement report and the separate measurement report, respectively.

In some aspects, the one or more instructions further cause the communications device to: receive at least one additional measurement report comprising at least one additional indication of at least one additional partial measurement of a second measurement type of the RS-P resource, the at least one additional partial measurement being measured by the wireless node across at least one subset of symbols of the multiple symbols.

In some aspects, partial measurements of the first measurement type are performed by the wireless node for multiple RS-Ps, and reporting of the partial measurements is performed for less than all of the RS-Ps.

In some aspects, the reporting of the partial measurements is performed periodically, aperiodically, or semi-periodically.

In some aspects, the measurement report is received in response to an on-demand request.

In some aspects, the on-demand request is configured to request a single partial measurement indication or multiple partial measurement indications.

In some aspects, the on-demand request specifies a number of the first subset of symbols, a starting symbol of the first subset of symbols, or a combination thereof.

In some aspects, the measurement report includes an indication of the first subset of symbols.

In some aspects, the first measurement type corresponds to a reference signal time difference (RSTD) measurement or a receive-transmit (Rx-Tx) time difference.

In some aspects, the wireless node corresponds to a base station or a user equipment (UE).

In some aspects, the RS-P corresponds to a downlink positioning reference signal (DL-PRS), an uplink sounding reference signal for positioning (UL-SRS-P) or a sidelink PRS (SL-PRS).

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
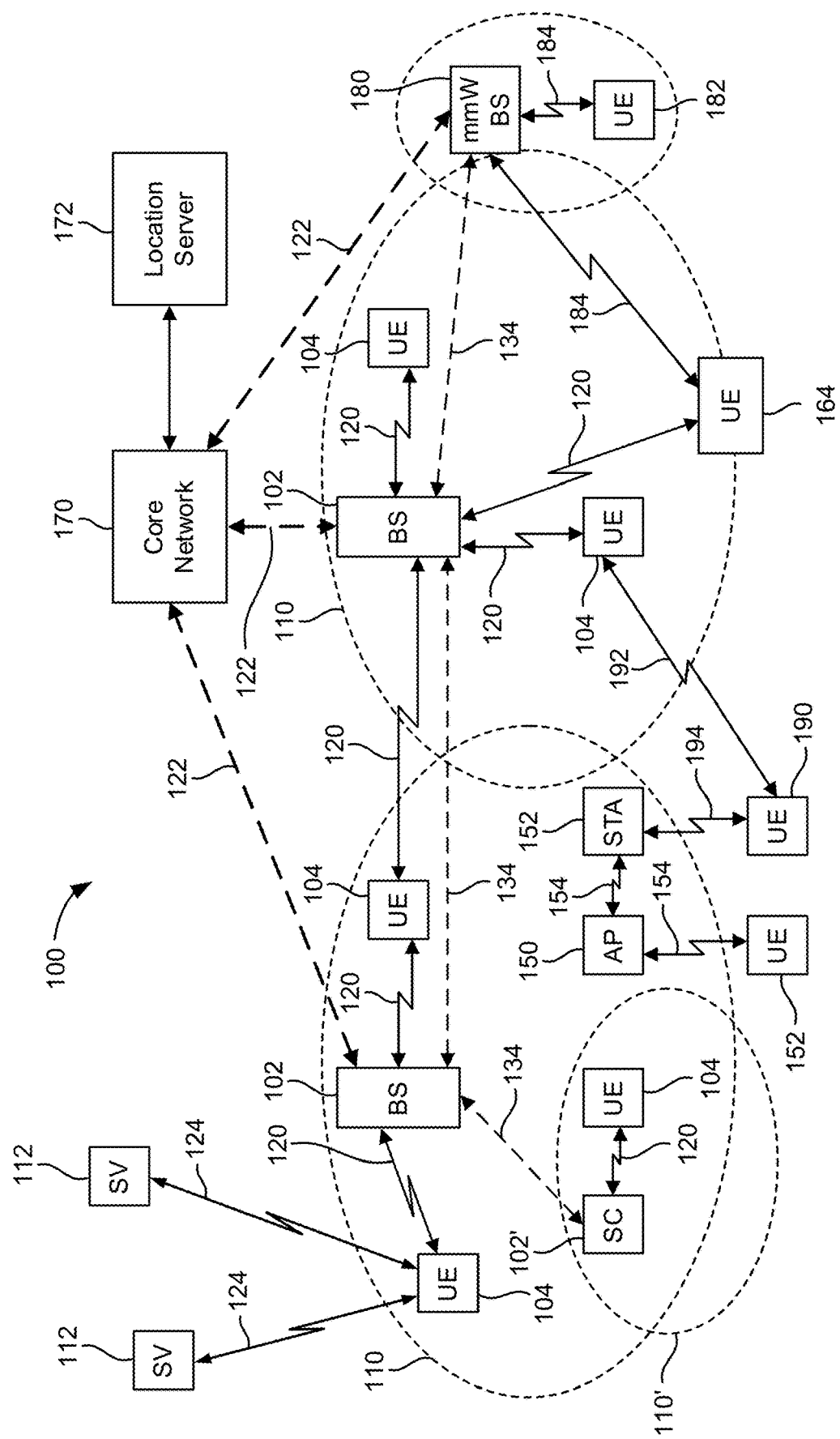
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communications device (e.g., a mobile phone, router, tablet computer, laptop computer, consumer asset locating device, wearable (e.g., smartwatch, glasses, augmented reality (AR) / virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
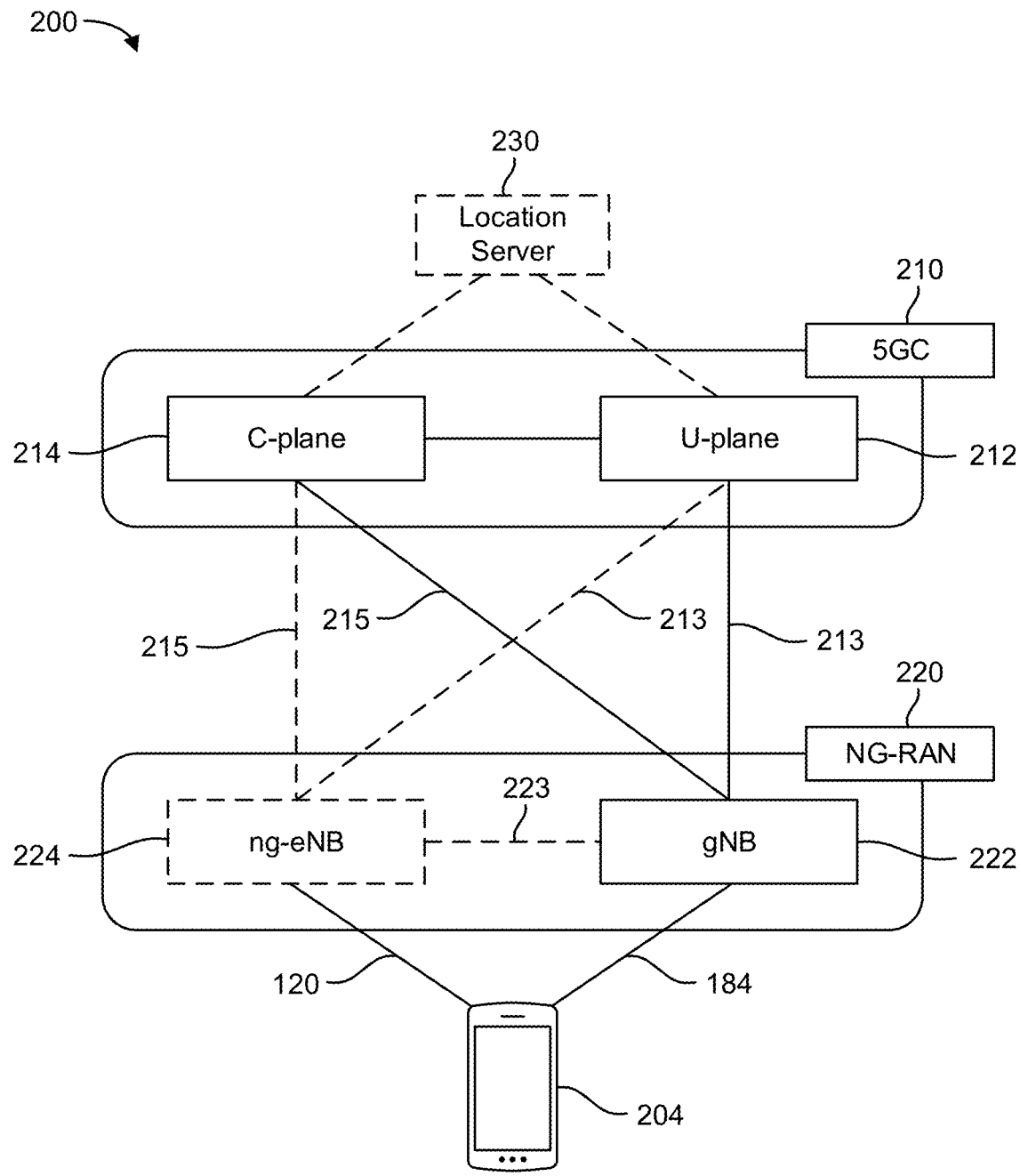
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
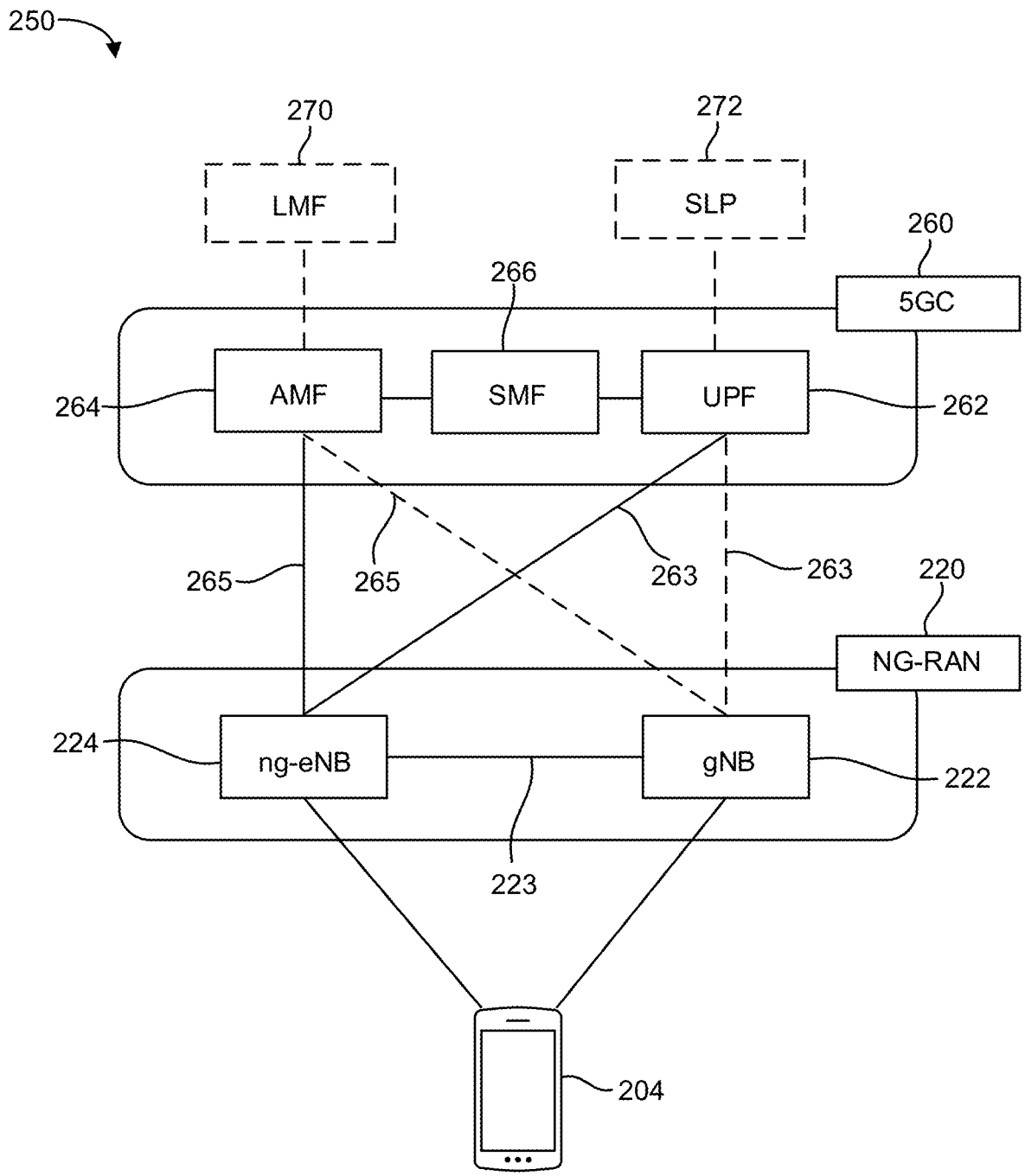

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/ downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
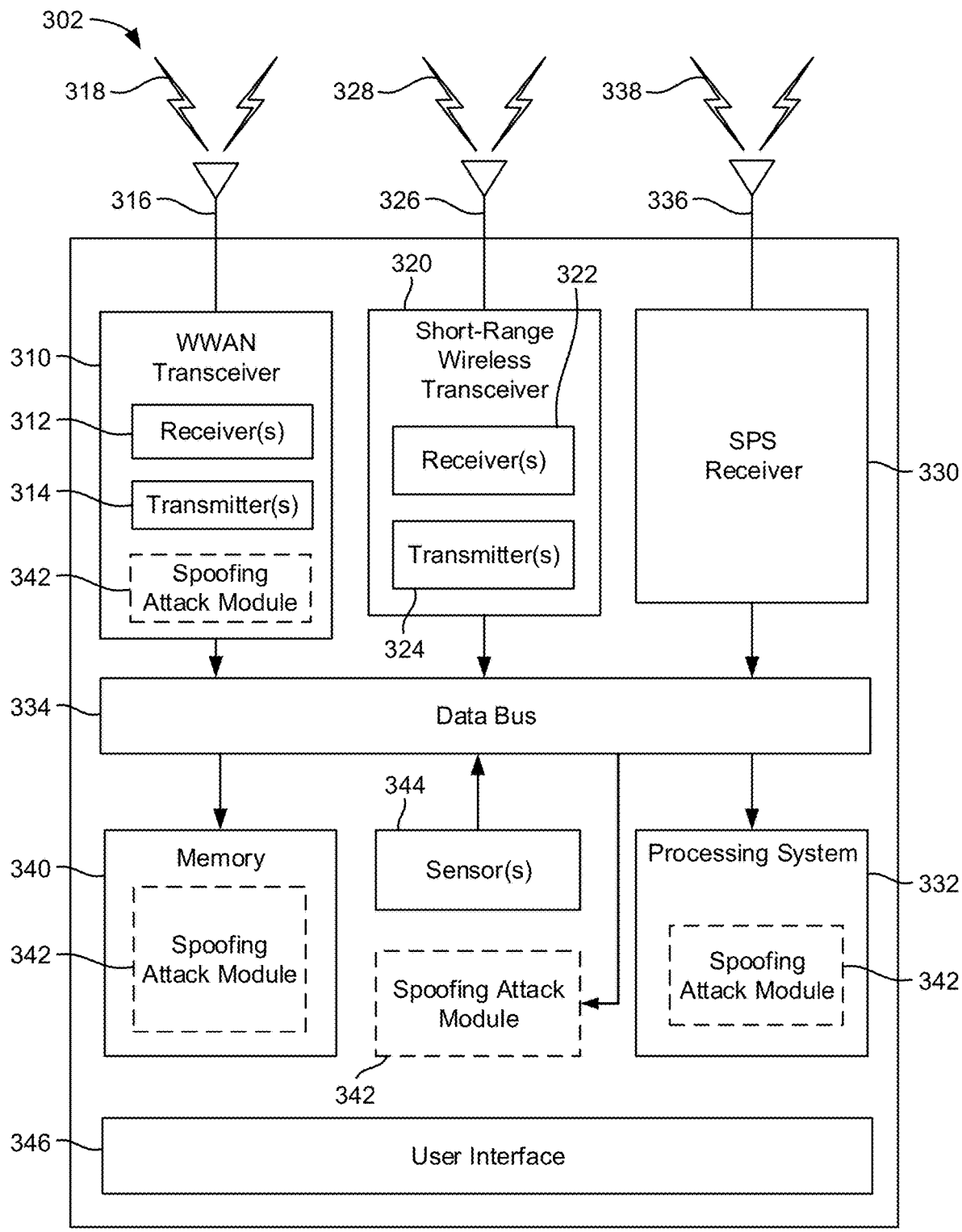
FIGS. 3A to 3C are simplified block diagrams of several sample aspects of components that may be employed in a user equipment (UE), a base station, and a network entity, respectively, and configured to support communications as taught herein.
Figure 3B:
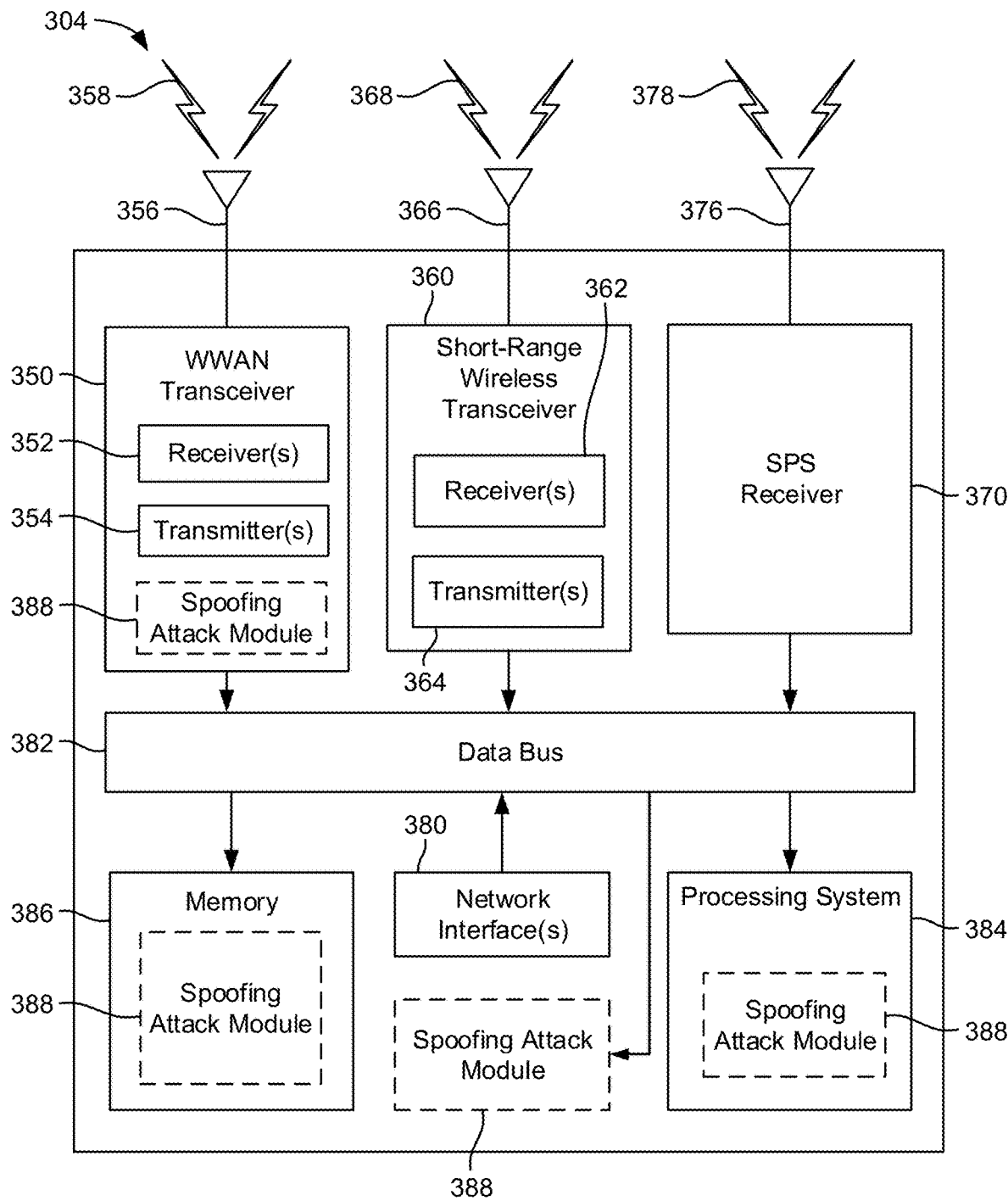
Figure 3C:
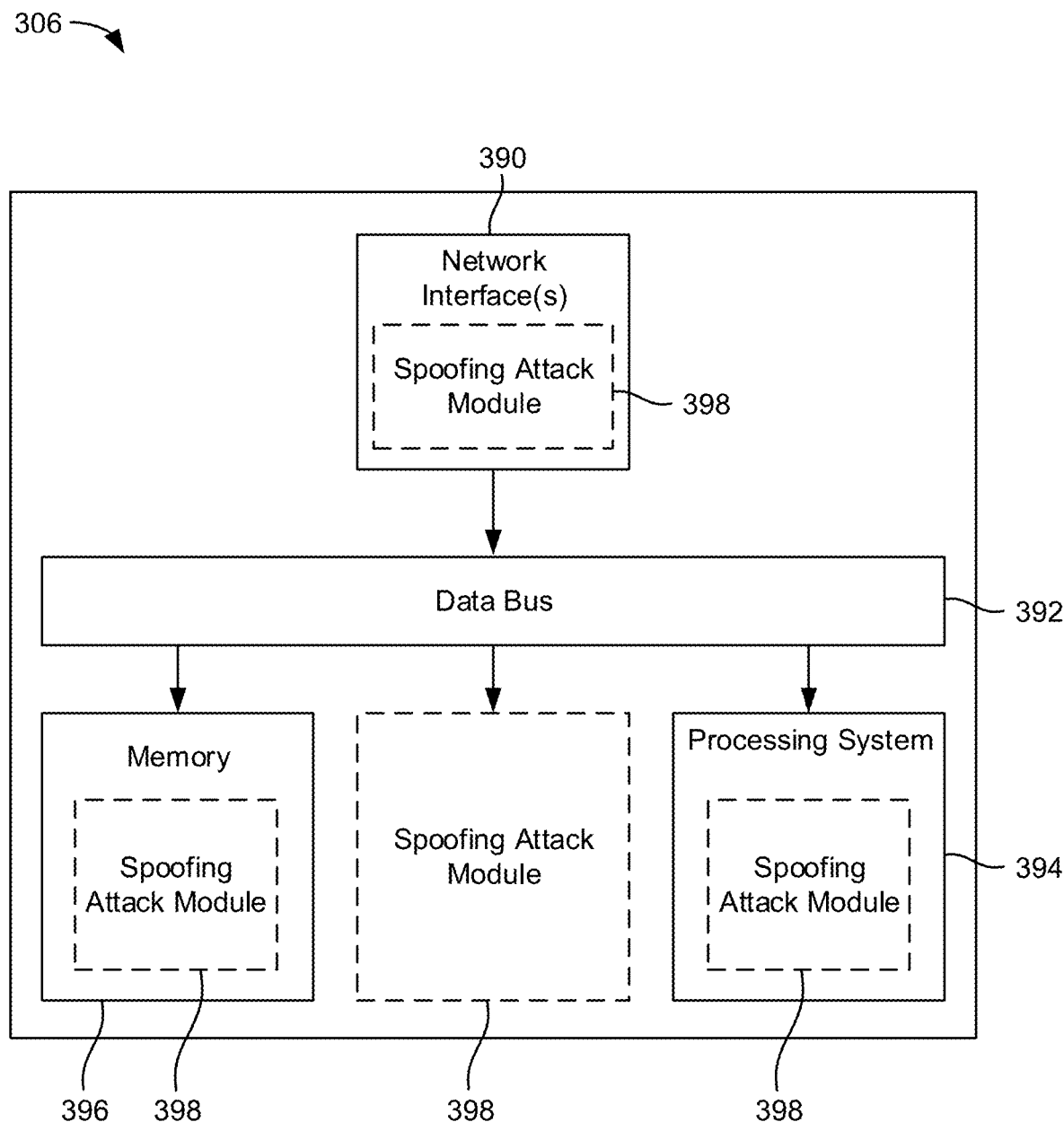

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communications device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communications device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include Spoofing Attack Modules 342, 388, and 398, respectively. The Spoofing Attack Modules 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the Spoofing Attack Modules 342, 388, and 398 may be external to the processing systems 332, 384, and 394 (e.g., part of a modem processing system, integrated with another processing system, etc.). Alternatively, the Spoofing Attack Modules 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the Spoofing Attack Module 342, which may be part of the WWAN transceiver 310, the memory component 340, the processing system 332, or any combination thereof, or may be a standalone component. FIG. 3B illustrates possible locations of the Spoofing Attack Module 388, which may be part of the WWAN transceiver 350, the memory component 386, the processing system 384, or any combination thereof, or may be a standalone component. FIG. 3C illustrates possible locations of the Spoofing Attack Module 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316.

The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360 the memory components 340, 386, and 396, the Spoofing Attack Modules 342, 388, and 398, etc.

Figure 4A:
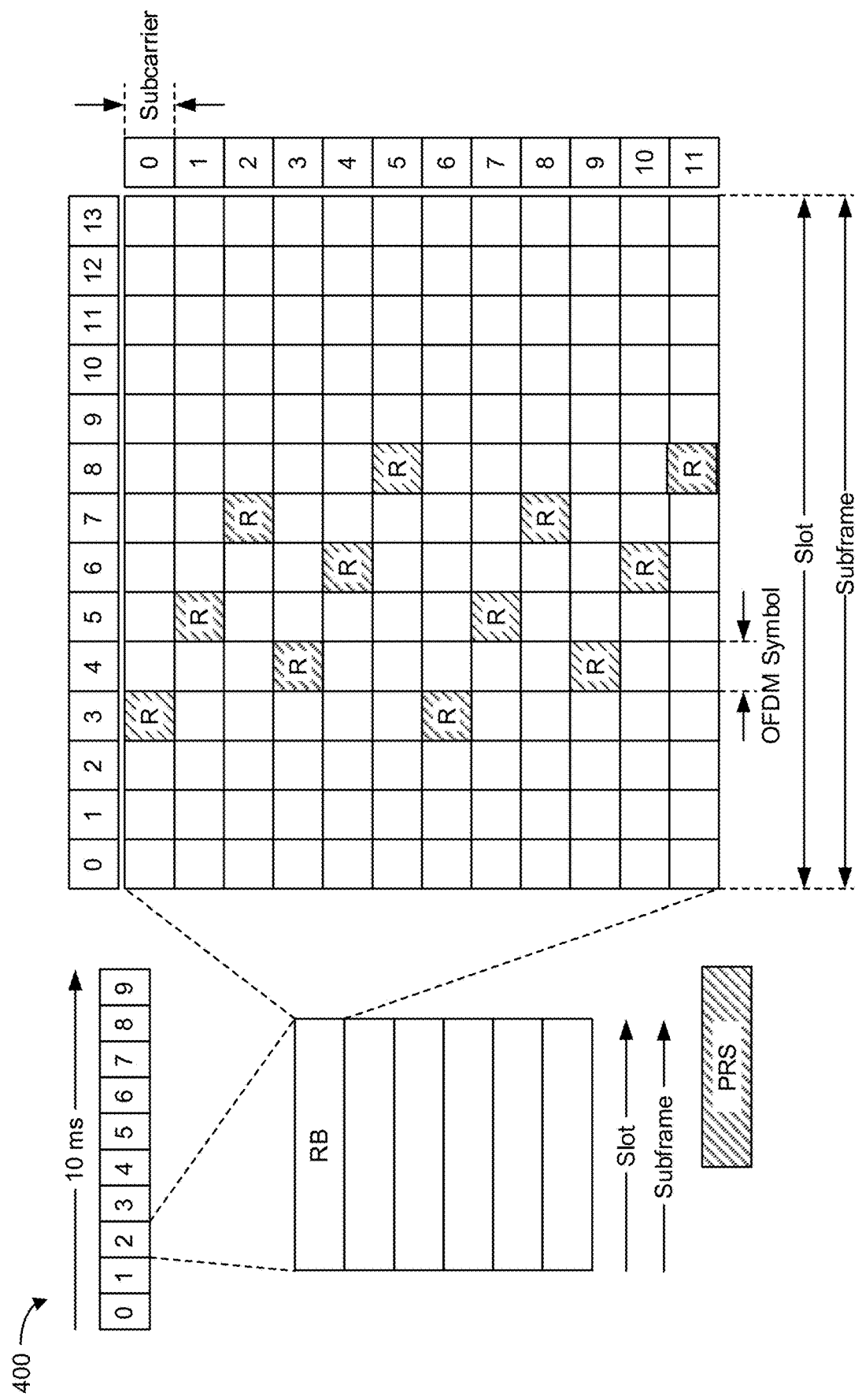
FIGS. 4A to 4D are diagrams illustrating example frame structures and channels within the frame structures, according to aspects of the disclosure.
Figure 4B:
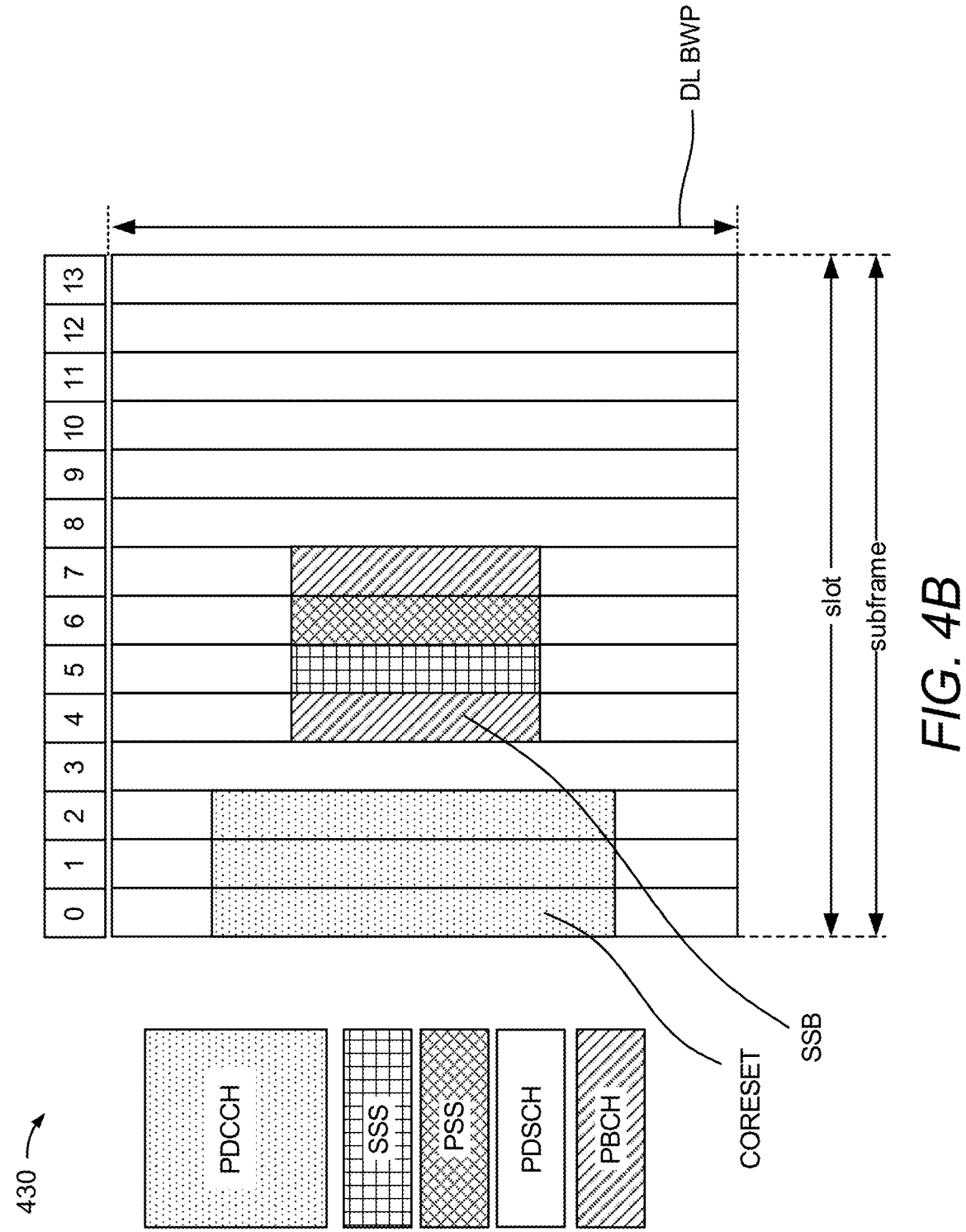
Figure 4C:
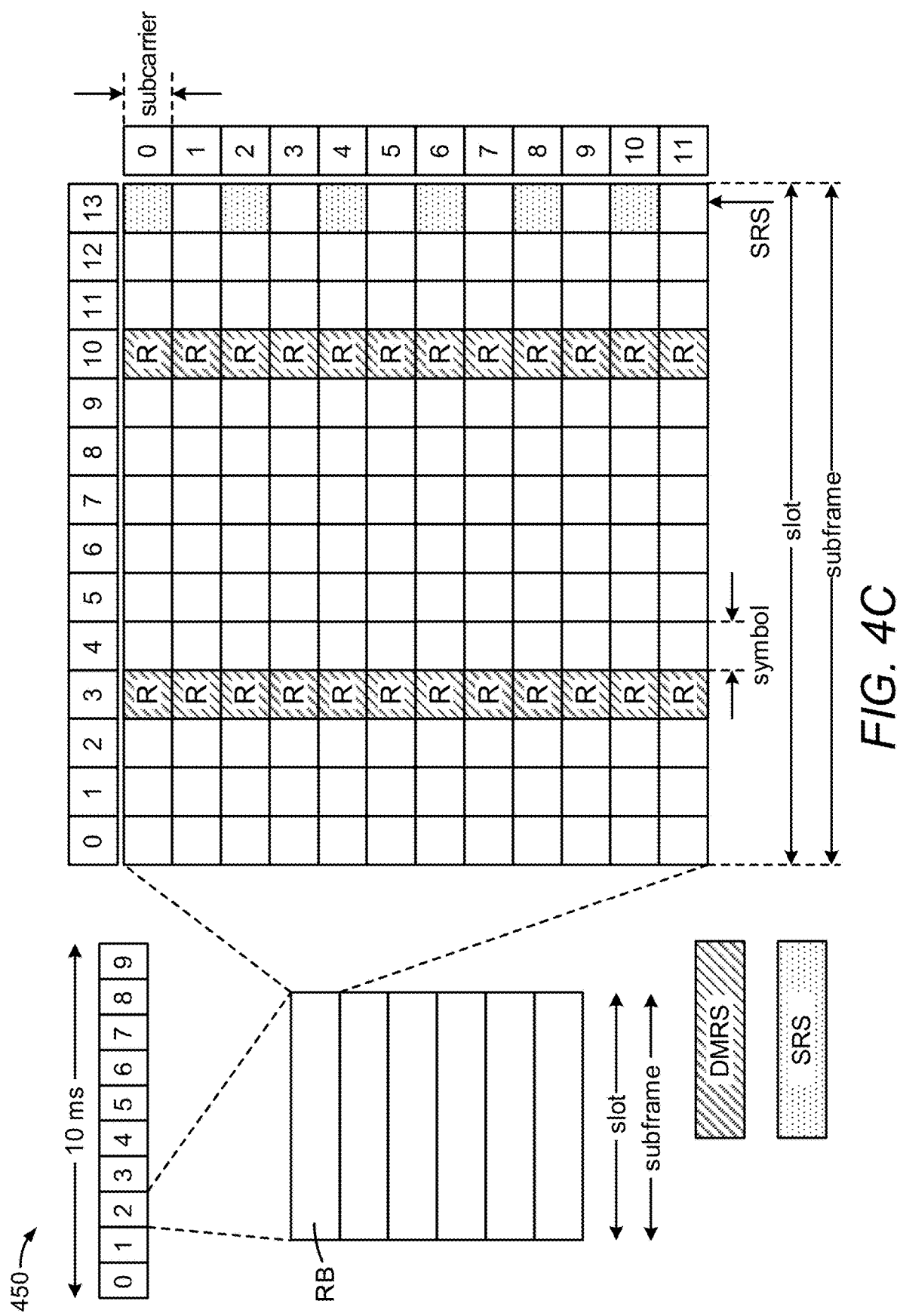
Figure 4D:
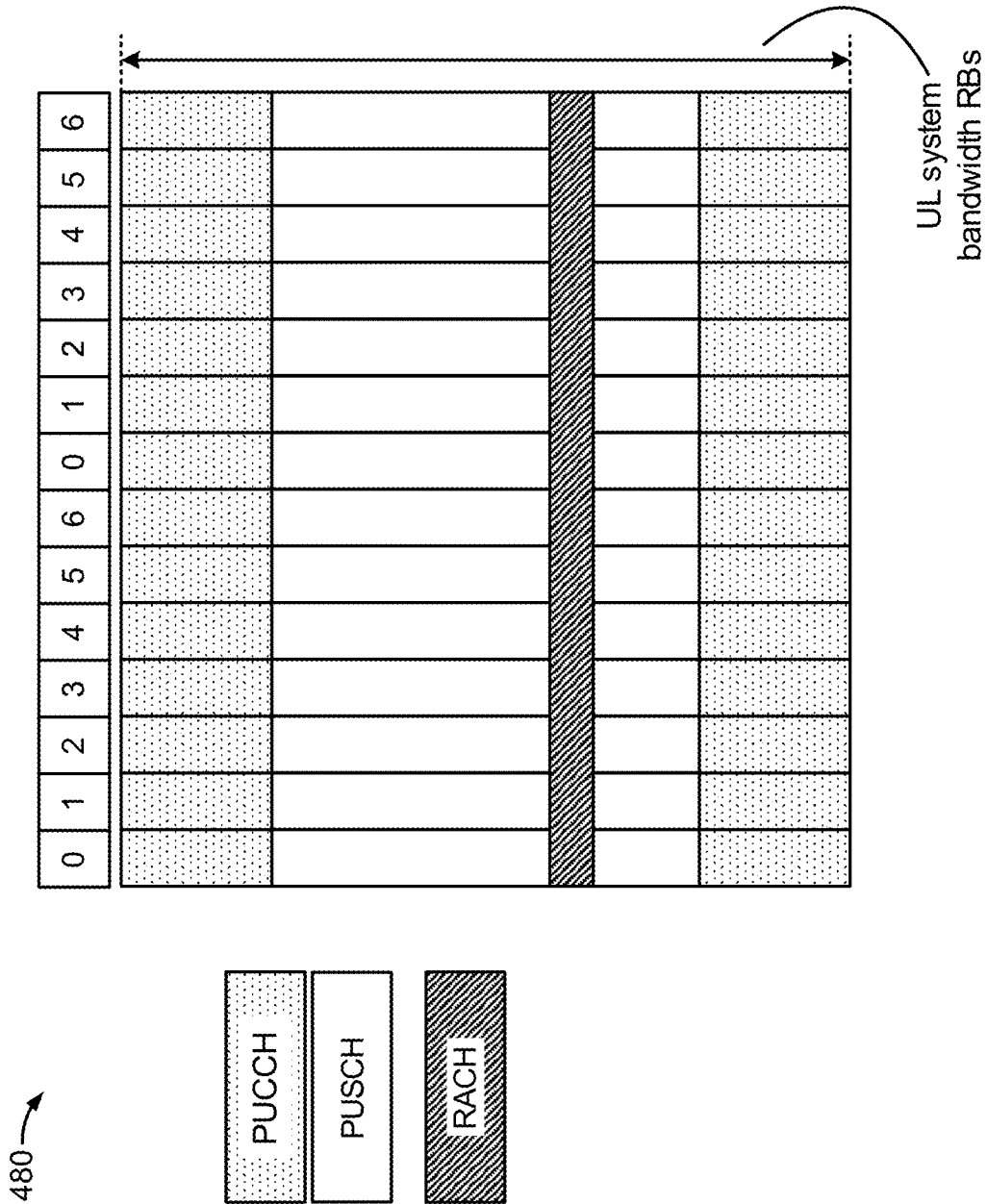

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS (v2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0};

2-symbol comb-2: {0, 1}; 4-symbol comb-2: {0, 1, 0, 1}; 4-symbol comb- 4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for- positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
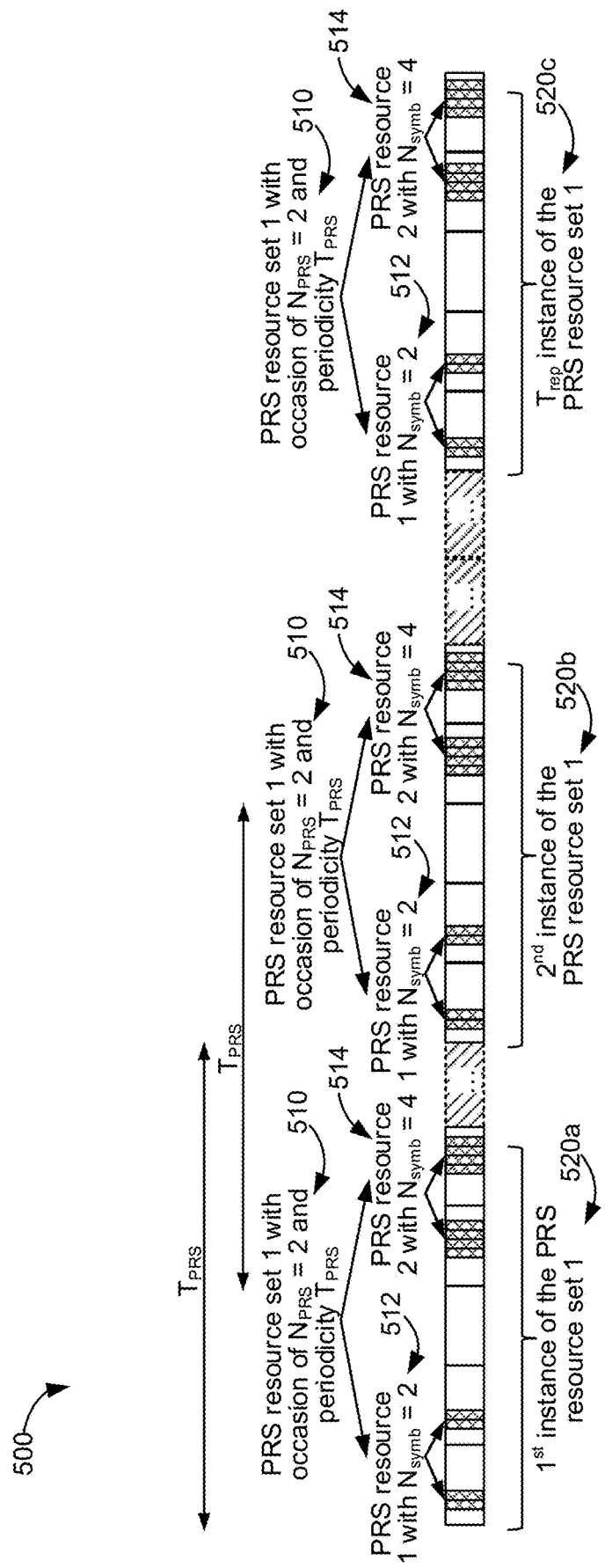
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. In the example of FIG. 5, a PRS resource set 510 (labeled "PRS resource set 1") includes two PRS resources, a first PRS resource 512 (labeled "PRS resource 1") and a second PRS resource 514 (labeled "PRS resource 2"). The base station transmits PRS on the PRS resources 512 and 514 of the PRS resource set 510.

The PRS resource set 510 has an occasion length (N_PRS) of two slots and a periodicity (T_PRS) of, for example, 160 slots or 160 milliseconds (ms) (for 15 kHz subcarrier spacing). As such, both the PRS resources 512 and 514 are two consecutive slots in length and repeat every T_PRS slots, starting from the slot in which the first symbol of the respective PRS resource occurs. In the example of FIG. 5, the PRS resource 512 has a symbol length (N_symb) of two symbols, and the PRS resource 514 has a symbol length (N_symb) of four symbols. The PRS resource 512 and the PRS resource 514 may be transmitted on separate beams of the same base station.

Each instance of the PRS resource set 510, illustrated as instances 520a, 520b, and 520c, includes an occasion of length '2' (i.e., N_PRS=2) for each PRS resource 512, 514 of the PRS resource set. The PRS resources 512 and 514 are repeated every T_PRS slots up to the muting sequence periodicity T_REP. As such, a bitmap of length T_REP would be needed to indicate which occasions of instances 520a, 520b, and 520c of PRS resource set 610 are muted (i.e., not transmitted).

In an aspect, there may be additional constraints on the PRS configuration 500. For example, for all PRS resources (e.g., PRS resources 512, 514) of a PRS resource set (e.g., PRS resource set 510), the base station can configure the following parameters to be the same: (a) the occasion length (T_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

Figure 6:
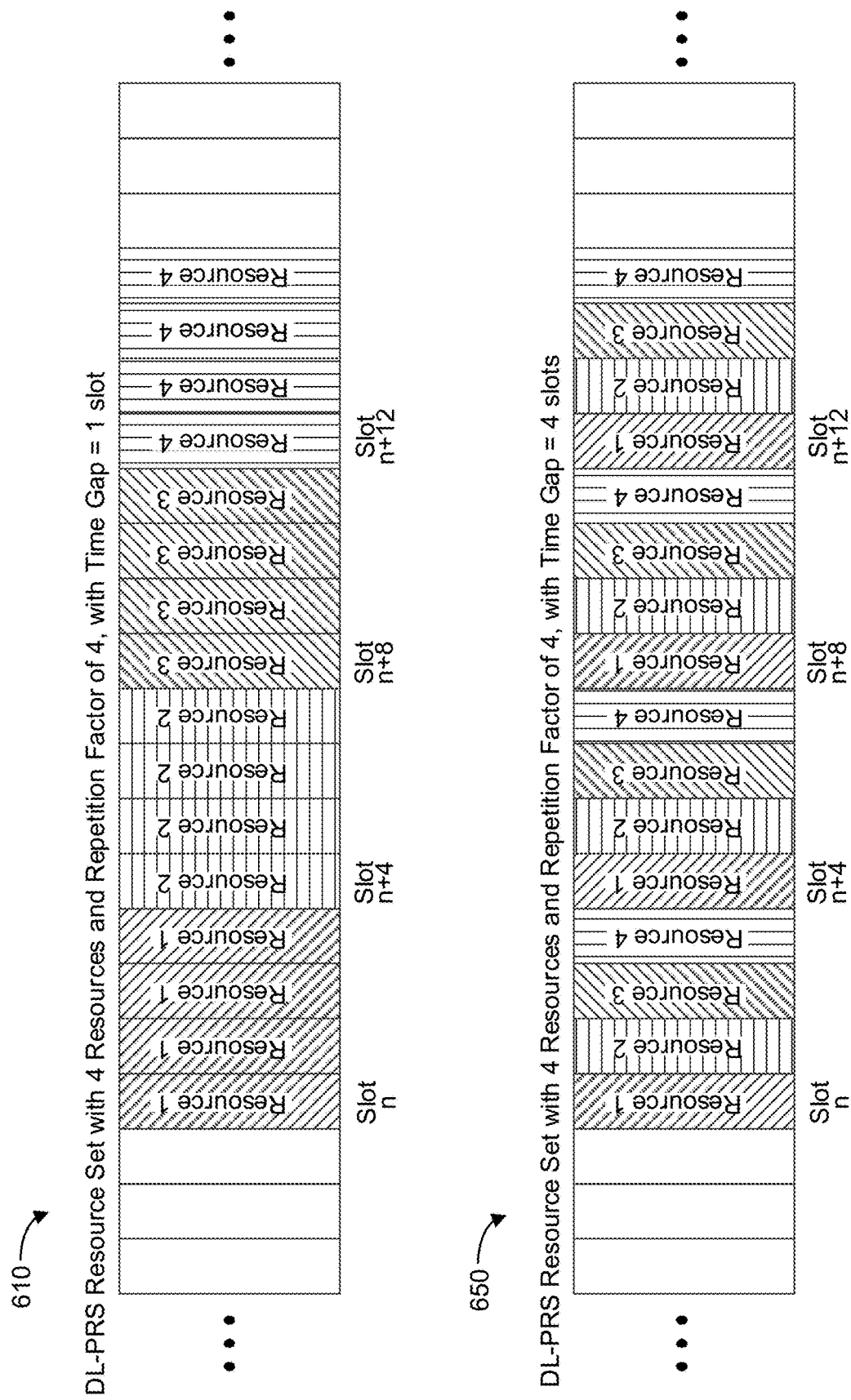
FIG. 6 is a diagram of example positioning reference signal (PRS) resource sets having different time gaps, according to aspects of the disclosure.

FIG. 6 is a diagram of example PRS resource sets having different time gaps, according to aspects of the disclosure. In the example of FIG. 6, time is represented horizontally and frequency is represented vertically. Each block represents a slot in the time domain and some bandwidth in the frequency domain.

FIG. 6 illustrates two DL-PRS resource set configurations, a first DL-PRS resource set configuration 610 and a second DL-PRS resource set configuration 650. Each DL-PRS resource set configuration 610 and 650 comprises four PRS resources (labeled "Resource 1," "Resource 2," "Resource 3," and "Resource 4") and has a repetition factor of four. A repetition factor of four means that each of the four PRS resources is repeated four times (i.e., is transmitted four times) within the DL-PRS resource set. That is, there are four repetitions of each of the four PRS resources within the DL-PRS resource set.

The DL-PRS resource set configuration 610 has a time gap of one slot, meaning that each repetition of a PRS resource (e.g., "Resource 1") starts on the first slot after the previous repetition of that PRS resource. Thus, as illustrated by DL-PRS resource set configuration 610, the four repetitions of each of the four PRS resources are grouped together. Specifically, the four repetitions of PRS resource "Resource 1" occupy the first four slots (i.e., slots n to n+3) of the DL-PRS resource set configuration 610, the four repetitions of PRS resource "Resource 2" occupy the second four slots (i.e., slots n+4 to n+7), the four repetitions of PRS resource "Resource 3" occupy the third four slots (i.e., slots n+8 to n+11), and the four repetitions of PRS resource "Resource 4" occupy the last four slots (i.e., slots n+12 to n+15).

In contrast, the DL-PRS resource set configuration 650 has a time gap of four slots, meaning that each repetition of a PRS resource (e.g., "Resource 2") starts on the fourth slot after the previous repetition of that PRS resource. Thus, as illustrated by DL-PRS resource set configuration 650, the four repetitions of each of the four PRS resources are scheduled every fourth slot. For example, the four repetitions of PRS resource "Resource 1" occupy the first, fifth, ninth, and thirteenth slots (i.e., slots n, n+4, n+8, and n+12) of the DL-PRS resource set configuration 650.

Note that the time duration spanned by one DL-PRS resource set containing repeated DL-PRS resources, as illustrated in FIG. 6, should not exceed the PRS periodicity. In addition, UE receive beam sweeping, for receiving/measuring the DL-PRS resource set, is not specified, but rather, depends on UE implementation.

Figure 7A:
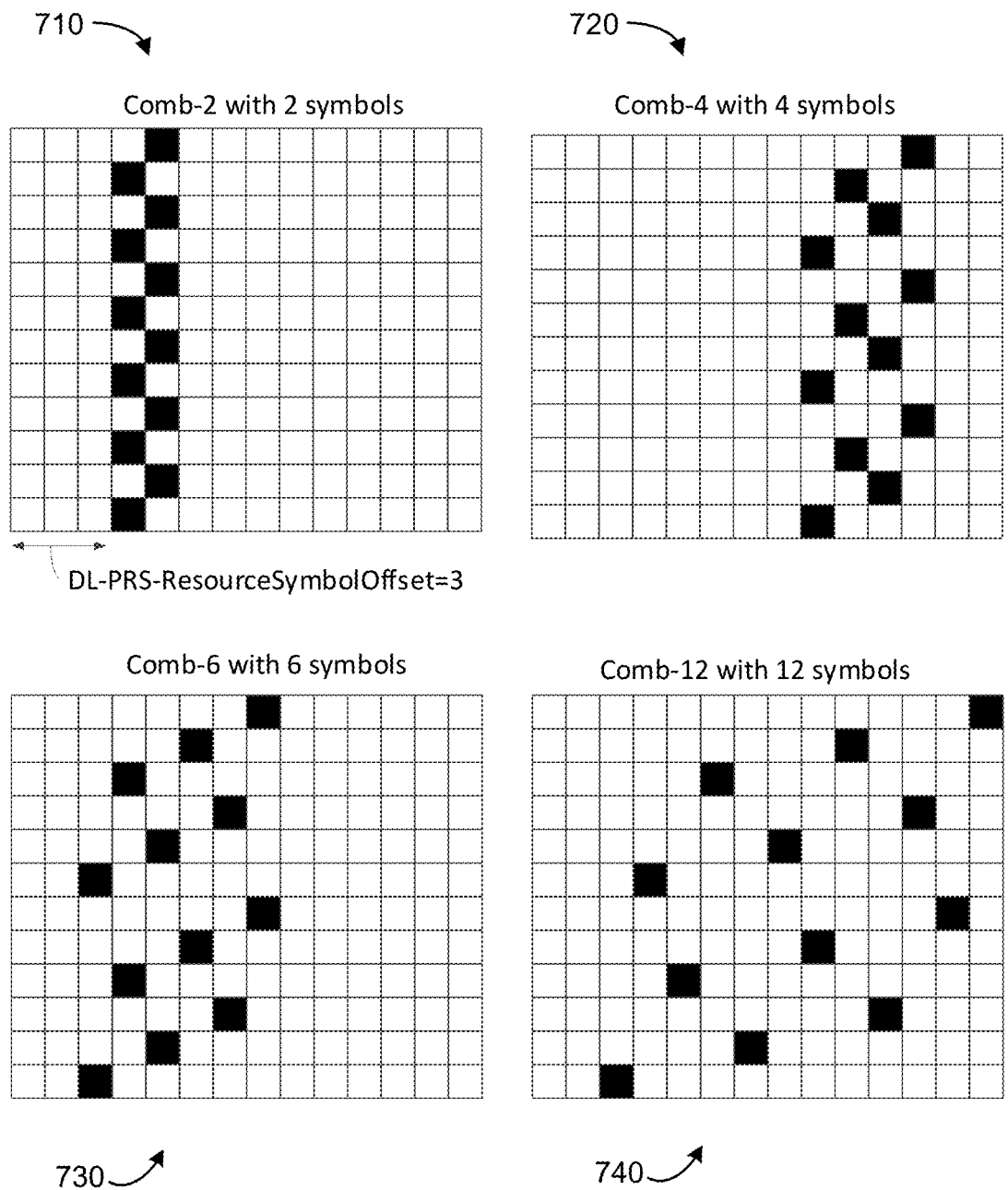
FIGS. 7A-7B illustrate various DL-PRS comb patterns, according to aspects of the disclosure.
Figure 7B:
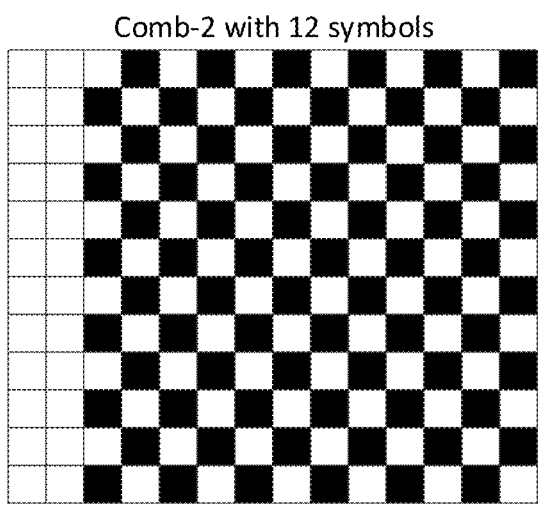
Figure 7B:
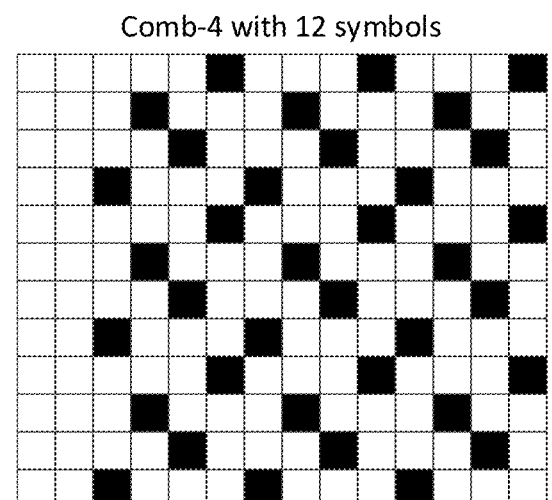
Figure 7B:
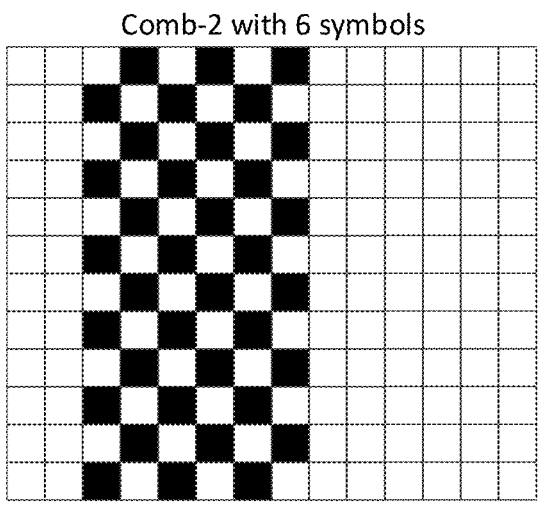
Figure 7B:
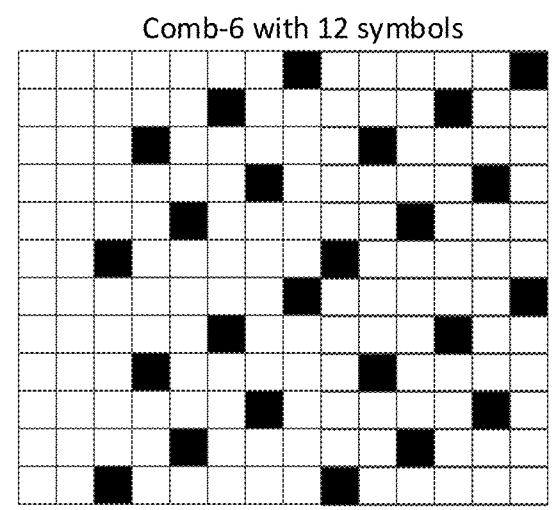

FIGS. 7A and 7B illustrate various comb patterns supported for DL-PRS within a resource block. In FIGS. 7A and 7B, time is represented horizontally and frequency is represented vertically. Each large block in FIGS. 7A and 7B represents a resource block and each small block represents a resource element. As discussed above, a resource element consists of one symbol in the time domain and one subcarrier in the frequency domain. In the example of FIGS. 7A and 7B, each resource block comprises 14 symbols in the time domain and 12 subcarriers in the frequency domain. The shaded resource elements carry, or are scheduled to carry, DL-PRS. As such, the shaded resource elements in each resource block correspond to a PRS resource, or the portion of the PRS resource within one resource block (since a PRS resource can span multiple resource blocks in the frequency domain).

The illustrated comb patterns correspond to various DL-PRS comb patterns described above. Specifically, FIG. 7A illustrates a DL-PRS comb pattern 710 for comb-2 with two symbols, a DL-PRS comb pattern 720 for comb-4 with four symbols, a DL-PRS comb pattern 730 for comb-6 with six symbols, and a DL-PRS comb pattern 740 for comb-12 with 12 symbols. FIG. 7B illustrates a DL-PRS comb pattern 750 for comb-2 with 12 symbols, a DL-PRS comb pattern 760 for comb-4 with 12 symbols, a DL-PRS comb pattern 770 for comb-2 with six symbols, and a DL-PRS comb pattern 780 for comb-6 with 12 symbols.

Note that in the example comb patterns of FIG. 7A, the resource elements on which the DL-PRS are transmitted are staggered in the frequency domain such that there is only one such resource element per subcarrier over the configured number of symbols. For example, for DL-PRS comb pattern 720, there is only one resource element per subcarrier over the four symbols. This is referred to as "frequency domain staggering."

Further, there is some DL-PRS resource symbol offset (given by the parameter "DL-PRS-ResourceSymbolOffset") from the first symbol of a resource block to the first symbol of the DL-PRS resource. In the example of DL-PRS comb pattern 710, the offset is three symbols. In the example of DL-PRS comb pattern 720, the offset is eight symbols. In the examples of DL-PRS comb patterns 730 and 740, the offset is two symbols. In the examples of DL-PRS comb pattern 750 to 780, the offset is two symbols.

As will be appreciated, a UE would need to have higher capabilities to measure the DL-PRS comb pattern 710 than to measure the DL-PRS comb pattern 720, as the UE would have to measure resource elements on twice as many subcarriers per symbol for DL-PRS comb pattern 710 as for DL-PRS comb pattern 720. In addition, a UE would need to have higher capabilities to measure the DL-PRS comb pattern 730 than to measure the DL-PRS comb pattern 740, as the UE will have to measure resource elements on twice as many subcarriers per symbol for DL-PRS comb pattern 730 as for DL-PRS comb pattern 740. Further, the UE would need to have higher capabilities to measure the DL-PRS comb patterns 710 and 720 than to measure the DL-PRS comb patterns 730 and 740, as the resource elements of DL-PRS comb patterns 710 and 720 are denser than the resource elements of DL-PRS comb patterns 730 and 740.

In NR, a scrambling identifier is defined per PRS resource, and a pseudo-random QPSK sequence changes per OFDM symbol per slot. For example, in some NR systems, the pseudo-random sequence generator shall be initialised with:

$$c_{init} = \left(2^{22}\left\lfloor\frac{n_{ID,seq}^{PRS}}{1024}\right\rfloor + 2^{10}\left(N_{symb}^{slot}n_{s,f}^{\mu} + l + 1\right)\left(2\left(n_{ID,seq}^{PRS} \bmod 1024\right) + 1\right) + \left(n_{ID,seq}^{PRS} \bmod 1024\right)\right) \bmod 2^{31}$$

where $n_{s,f}^{\mu}$ is the slot number, the downlink PRS sequence ID $n_{ID,seq}^{PRS} \in \{0,1,\ldots,4095\}$ is given by the higher-layer parameter dl-PRS-SequenceID-r16, and l is the OFDM symbol within the slot to which the sequence is mapped.

The above-noted parameters may be indicated to the UE via NR-DL-PRS-Resource-r16, e.g.:

```
NR-DL-PRS-Resource-r16 ::= SEQUENCE {
  NR-DL-PRS-Resource-r16 ::= SEQUENCE {
  nr-DL-PRS-ResourceID-r16           NR-DL-PRS-ResourceID-r16,
  dl-PRS-SequenceID-r16              INTEGER (0.. 4095),
  dl-PRS-CombSizeN-AndReOffset-r16   CHOICE {
    n2-r16                           INTEGER (0..1),
    n4-r16                           INTEGER (0..3),
    n6-r16                           INTEGER (0..5),
    n12-r16                          INTEGER (0..11),
    ...
  },
  dl-PRS-ResourceSlotOffset-r16   INTEGER (0..nrMaxResourceOffsetValue-1-r16),
  dl-PRS-ResourceSymbolOffset-r16    INTEGER (0..12),
  dl-PRS-QCL-Info-r16                DL-PRS-QCL-Info-r16
  OPTIONAL,
  ...
}
```

Ranging is supported in current Wi-Fi systems. Channel Estimates using Long Training Fields (LTFs) can identify the first path even in multipath environments, if the first path is not too weak (e.g., within 10 dB of strongest path). IEEE 802.11az builds upon 802.11ax and is an IEEE project for secure ranging. One objective IEEE 802.11az is a secure LTF design. One of the main issues for secure LTFs is to avoid someone from spoofing the LTFs (e.g., making it look like the distance between the two stations (STAs) is less than the actual distance).

Some examples of man-in-the-middle or "spoofing" attacks (e.g., some of which may be characterized as "repetition-based" spoofing attacks) are as follows:

TABLE 1

Spoofing Attack Descriptions and Mitigation Techniques for IEEE 802.11az

| Spoofing Attack Name | Spoofing Attack Description | Enhancement in IEEE 802.11az |
|---|---|---|
| Cyclic Prefix (CP) Attack | The Attacker listens to the CP at the beginning of one PRS symbol, and transmits a copy of the CP | Remove the CP (Zero Guard OFDM) |
| Noise Attack (Jamming) | The Attacker transmits noise. Sometimes, this will produce a channel estimate with an artificially sooner path. | Check for consistency between repetitions for attack detection. This particular attack type may not be characterized as a "repetition-based" attack. |
| Computational (frequency domain (FD)) Attack | The Attacks listens to the initial part of the PRS, decodes it, and then send an Attack in the second part of the PRS | 64-QAM modulation, AES-128 Counter mode, stream cipher, in the PHY for random pseudo bit generation, and/or Pre-stream phase rotation to reduce unintended beamforming |
| Sample-by-sample (or minimum mean square error (MMSE) or time- | The Attacker listens to a portion of the PRS symbol and then predicts a few future | Frequency domain window: different windows make the farther out |

TABLE 1-continued

Spoofing Attack Descriptions and Mitigation Techniques for IEEE 802.11az

| Spoofing Attack Name | Spoofing Attack Description | Enhancement in IEEE 802.11az |
|---|---|---|
| domain (TD)) Attack | samples. Bandlimited waveform, with autocorrelation between samples. | predictions more difficult. |

Figure 8:
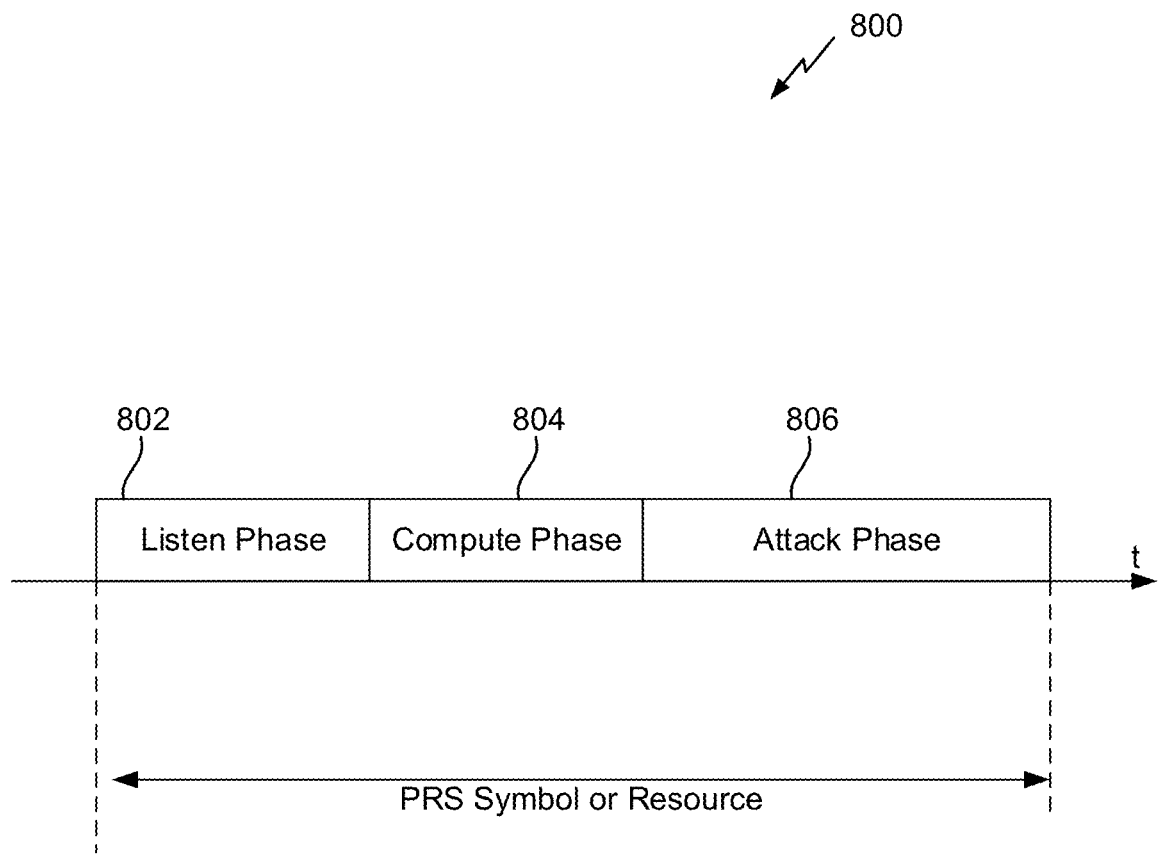
FIG. 8 illustrates a PRS spoofing attack in accordance with an aspect of the disclosure.

FIG. 8 illustrates a PRS spoofing attack 800 in accordance with an aspect of the disclosure. In FIG. 8, the PRS spoofing attack 800 of a PRS symbol or resource (e.g., potentially spanning multiple symbols) includes a listen phase 802, a compute phase 804 and an attack phase 806. The attacker looks at the first part of the PRS during the listen phase 802. The attacker determines which QAM symbols are sent, and then the scrambling ID, during the compute phase 804. This is also known as Frequency-Domain (FD) attack. For an across-symbol attacker, the attacker receives a set of PRS symbols at 802, performs blind detection of which scrambling ID was used at 804, and transmits the remaining PRS symbols with some Timing Advance at 806. For a within-symbol attacker, the attacker is able to receive a part of just a single OFDM symbol at 802, perform the FD or TD attack (computation or symbol-by-symbol attack) at 804, and transmit the remaining part of that single symbol with a timing advance at 806.

Figure 9:
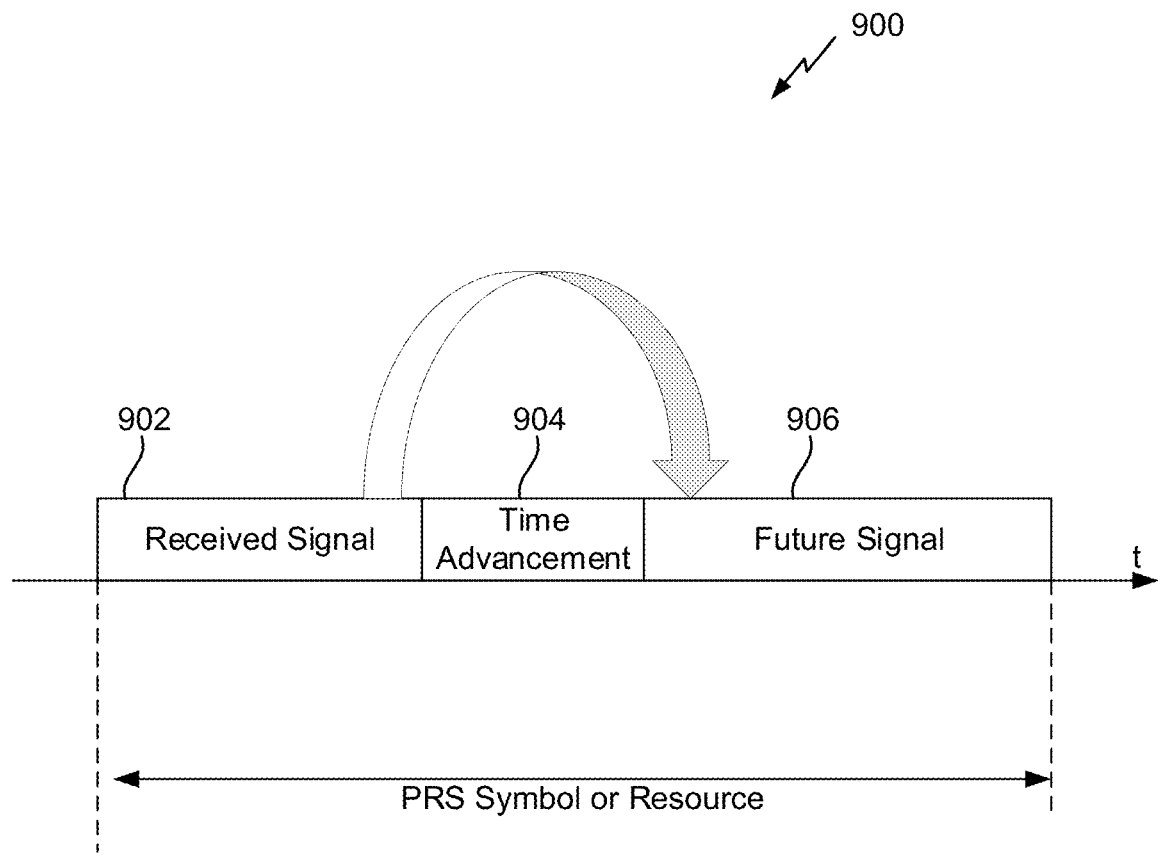
FIG. 9 illustrates a PRS spoofing attack in accordance with another aspect of the disclosure.

FIG. 9 illustrates a PRS spoofing attack 900 in accordance with an aspect of the disclosure. In FIG. 9, the PRS spoofing attack 900 is a sample-by-sample or TD attack, and includes a PRS symbol or resource (e.g., potentially spanning multiple symbols) includes a received signal phase 902, a time advancement 904, and a future signal 906. The time advancement 904 of the future signal 906 (or attack signal) may have a duration set to a number of samples, such as 3, 4, 5, etc. samples. In the PRS spoofing attack 900, the attacker receives a first part of the signal at 902, determines the correlation (band- limited signal) and predicts a few samples in the future at 906. A Wiener filter predicts the future signal 906 by exploiting the correlation between the signal previously received at 902 and the future signal unreceived. This is also known as a Time-Domain (TD) attack.

Figure 10A:
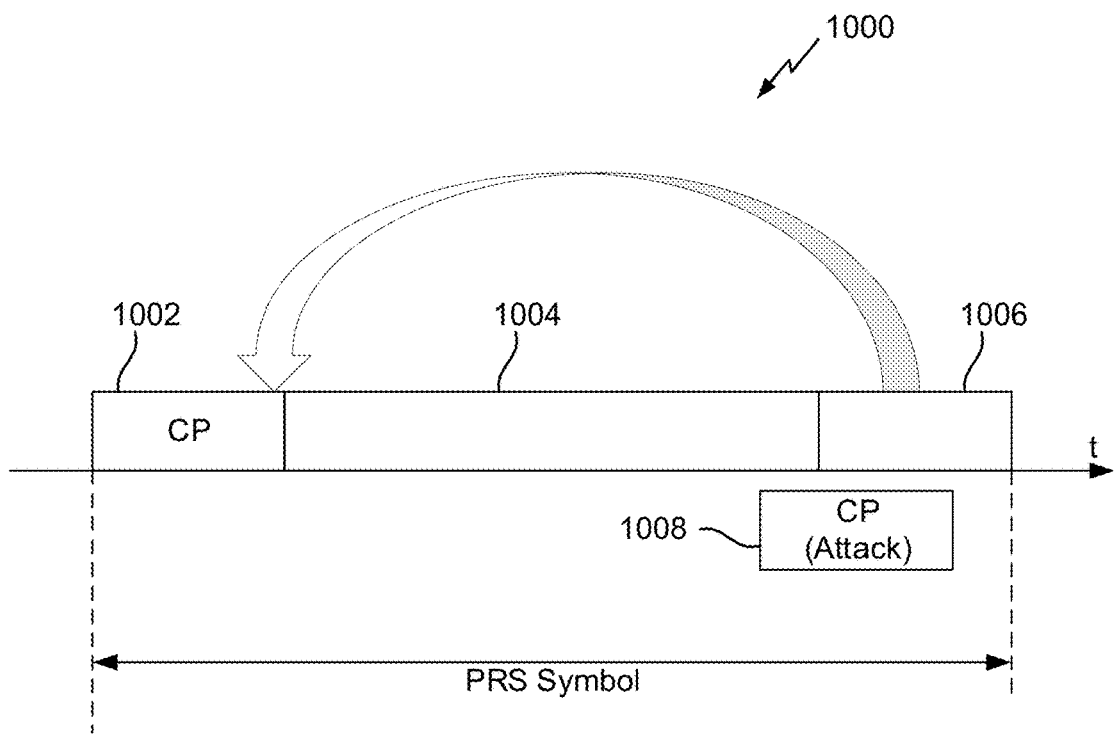
FIG. 10A illustrates a PRS spoofing attack in accordance with another aspect of the disclosure.

FIG. 10A illustrates a PRS spoofing attack 1000 in accordance with an aspect of the disclosure. In FIG. 10A, a PRS symbol (e.g., OFDM symbol) includes a CP 1002, a PRS part 1004 and a PRS ending part 1006. The CP 1002 is identical to the PRS ending part 1006. Here, the attacks listens to the CP 1002, and then transmits a copy of the CP 1002 at 1008 in a later part of the PRS symbol.

Figure 10B:
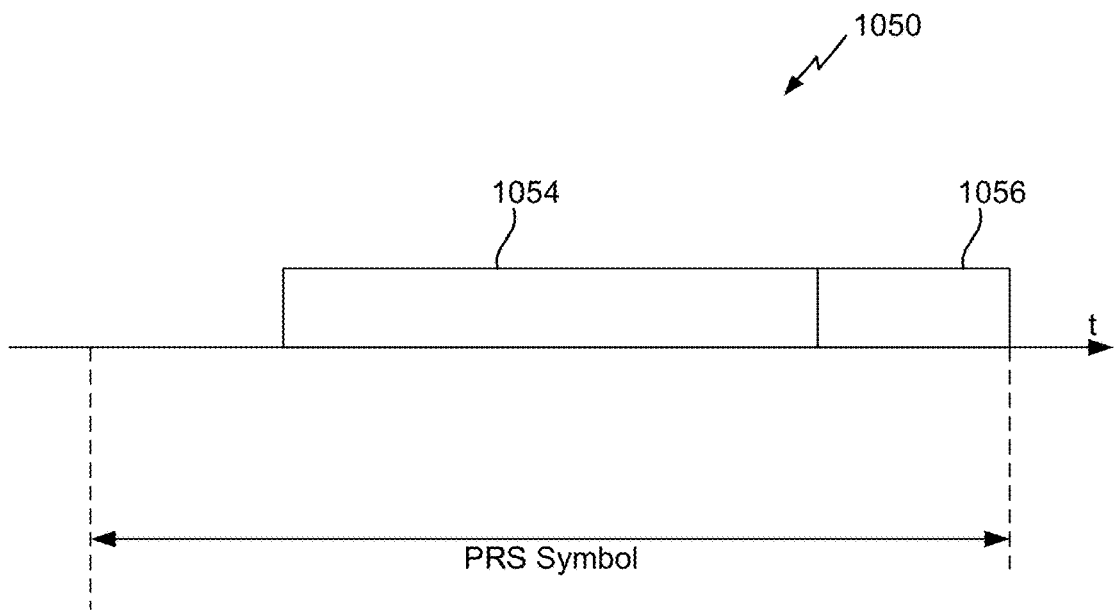
FIG. 10B illustrates an example mitigation technique for countering the PRS spoofing attack of FIG. 10A in accordance with an aspect of the disclosure.

FIG. 10B illustrates an example mitigation technique 1050 for countering the PRS spoofing attack 1000 of FIG. 10A in accordance with an aspect of the disclosure. In FIG. 10B, a PRS symbol (e.g., OFDM symbol) a PRS part 1054 and a PRS ending part 1056. In FIG. 10B, the CP 1002 from FIG. 10A is simply omitted altogether, such that the CP 1002 cannot be copied and transmitted by the attacker. The mitigation technique 1050, which may be referred to as a zero CP or zero guard interval (GI) technique, adds complexity to the channel estimation.

Security of NR UE positioning is important for commercialization and may enable more use cases. However, there is no PHY layer security technologies for NR UE positioning in current 3GPP designs. The solution of zero GI to deal with CP attack proposed for IEEE 802.11az may not be easily adopted in 3GPP, as the fundamental waveform changes in NR spec makes such an implementation more challenging. Also, unlike 802.11az, there is some inherent repetition in NR PRS, even within a single PRS symbol (e.g., which can be monitored by an attacker and copied, similar to CP). For example, for comb2/12 symbol PRS resource, the PRS symbols are repeated 6 times. The attacker may thereby listen to the part of PRS resource and transmits a copy of the listened partial PRS resource with some manipulation, for example with some small time advancement.

In many cases, attacks occur in the latter part of a PRS/SRS resource, as the attacker may need to receive the first part of the PRS/SRS resource before initiating an attack in the later part of the PRS/SRS resource. Based on this observation by the inventors of the subject application, it is reasonable to assume that the first or beginning part is less likely to be attacked, and the corresponding measurement could be used for the attack detection. Another observation by the inventors of the subject application is that the attack may be impulsive and with short duration, hence the comparison of multiple partial PRS/SRS measurement could be used for attack detection.

Aspects of the disclosure are directed to spoofing attack detection partial measurement(s) of a reference signal for positioning (RS-P) (e.g., DL-PRS, UL-SRS-P, sidelink PRS, etc.). In some designs, the partial measurement(s) of the RS-P may be measured across a subset of RS-P symbols, such as the initial RS-P symbols and/or RS-P symbols in an earlier part of a respective RS-P resource. Such aspects may provide various technical advantages, such as improved spoofing attack detection which may improve positioning accuracy, network security, and so on.

Figure 11:
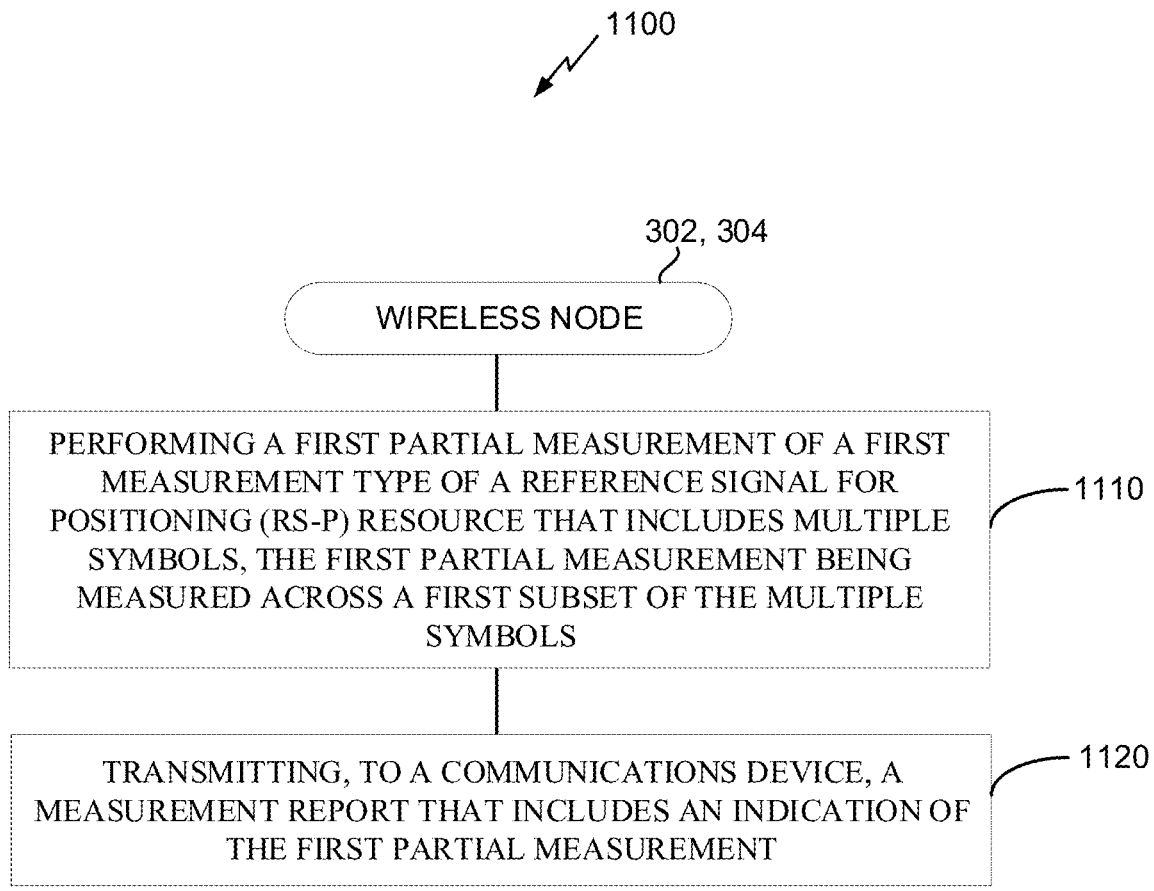
FIG. 11 illustrates an exemplary process of wireless communication, according to aspects of the disclosure.

FIG. 11 illustrates an exemplary process 1100 of wireless communication, according to aspects of the disclosure. In an aspect, the process 1100 may be performed by a wireless node, such as UE 302 (e.g., a target UE for which a positioning estimate is desired, an anchor or reference UE with a known position from a recent positioning fix, etc.) or BS 304 (e.g., a serving or non-serving gNB).

Referring to FIG. 11, at 1110, the wireless node (e.g., receiver 312 or 322 or 352 or 362, processing system 332 or 384, etc.) performs a first partial measurement of a first measurement type of a reference signal for positioning (RS-P) resource that includes multiple symbols, the first partial measurement being measured across a first subset of the multiple symbols. As will be described in more detail below, the first partial measurement may be measured across an initial subset of contiguous symbols or alternatively a subset of contiguous symbols that starts at a symbol later than the initial symbol of the RS-P resource.

Referring to FIG. 11, at 1120, the wireless node (e.g., transmitter 314 or 324 or 354 or 364, network interface(s) 380, data bus 334 or 382 etc.) transmits, to a communications device (e.g., a position estimation entity, a network component, etc.), a measurement report that includes an indication of the first partial measurement. In some designs, the wireless node itself may correspond to the communications device. In this case, the transmission at 1120 to this particular component may correspond to an internal transmission of data between logical components over a respective data bus, etc., rather than an external wireless or backhaul transmission. In some designs, the communications device need not be a position estimation entity, but could correspond to another type of network component (e.g., OEM server, application server, etc.).

Figure 12:
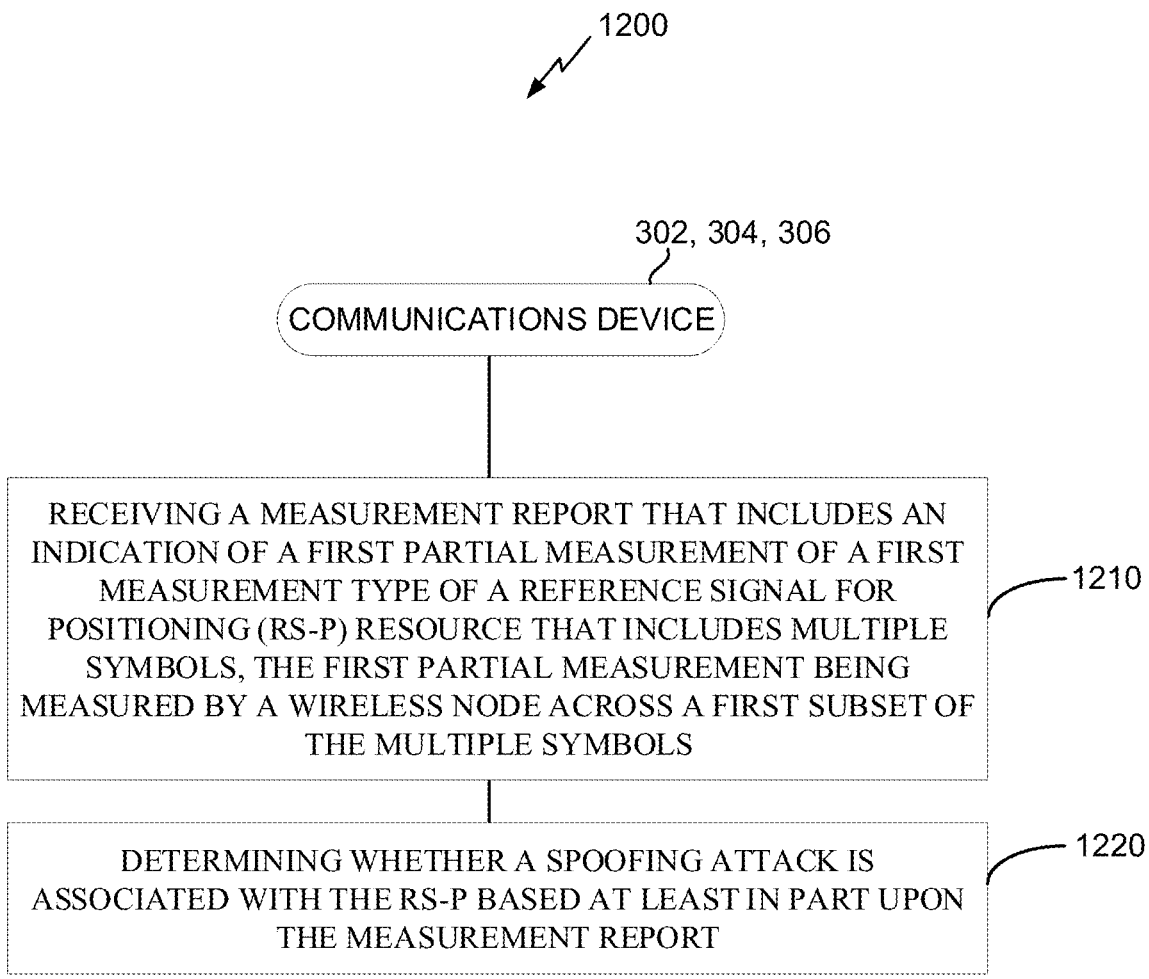
FIG. 12 illustrates an exemplary process of wireless communication, according to aspects of the disclosure.

FIG. 12 illustrates an exemplary process 1200 of wireless communication, according to aspects of the disclosure. In an aspect, the process 1200 may be performed by a communications device, such as a position estimation entity, which may correspond to a UE such as UE 302 (e.g., for UE-based positioning), a BS or gNB such as BS 304 (e.g., for LMF integrated in RAN), or a network entity 306 (e.g., core network component such as LMF). In other designs, the process 1200 may be performed by another type of network component (e.g., not necessarily a position estimation entity), such as an OEM server, application server, etc., to another UE, etc.

Referring to FIG. 12, at 1210, the communications device (e.g., receiver 312 or 322 or 352 or 362, network interface(s) 380 or 390, data bus 334 or 382, etc.) receives, from a wireless node, measurement report that includes an indication of a first partial measurement of a first measurement type of a reference signal for positioning (RS-P) resource that includes multiple symbols, the first partial measurement being measured by the wireless node across a first subset of the multiple symbols. As will be described in more detail below, the first partial measurement may be measured across an initial subset of contiguous symbols or alternatively a subset of contiguous symbols that starts at a symbol later than the initial symbol of the RS-P resource.

Referring to FIG. 12, at 1220, the communications device (e.g., processing system 332 or 384 or 394, etc.) determines whether a spoofing attack is associated with the RS-P based at least in part upon the measurement report. The determination of 1220 may be implemented in a variety of ways, as will be described below in more detail.

Figure 13:
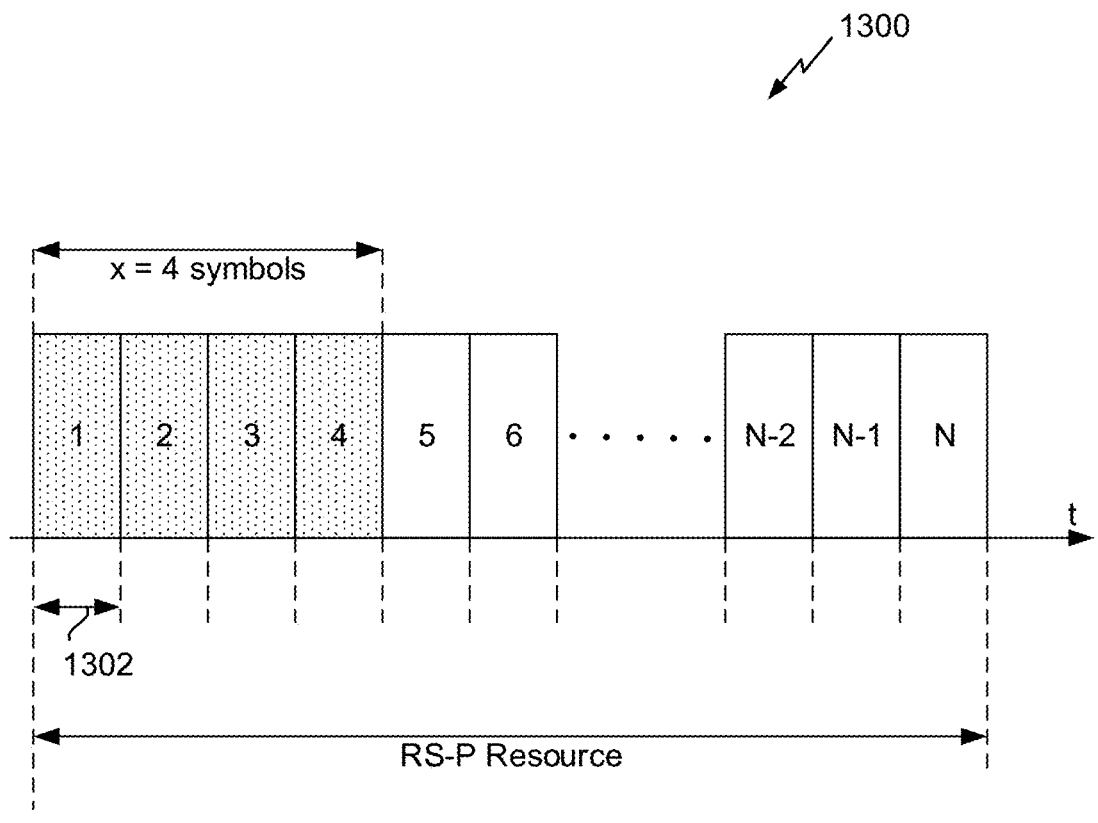
FIG. 13 illustrates an example implementation of the processes of FIGS. 11-12, respectively, in accordance with aspects of the disclosure.

FIG. 13 illustrates an example implementation 1300 of the processes 1100-1200 of FIGS. 11-12, respectively, in accordance with aspects of the disclosure. In FIG. 13, an RS-P resource (e.g., DL-PRS resource, UL-SRS-P resource, sidelink PRS resource, etc.) including symbols 1. . . N is depicted, each with symbol duration 1302. In FIG. 13, the first subset of symbols includes two or more contiguous symbols (i.e., symbols 1-4) that begin at an initial symbol (i.e., symbol 1) of the RS-P resource. For example, for a comb-n PRS/SRS resource, UE/gNB could make an additional measurement on the first x (x<n) PRS/SRS symbol(s) within the resource.

Figure 14:
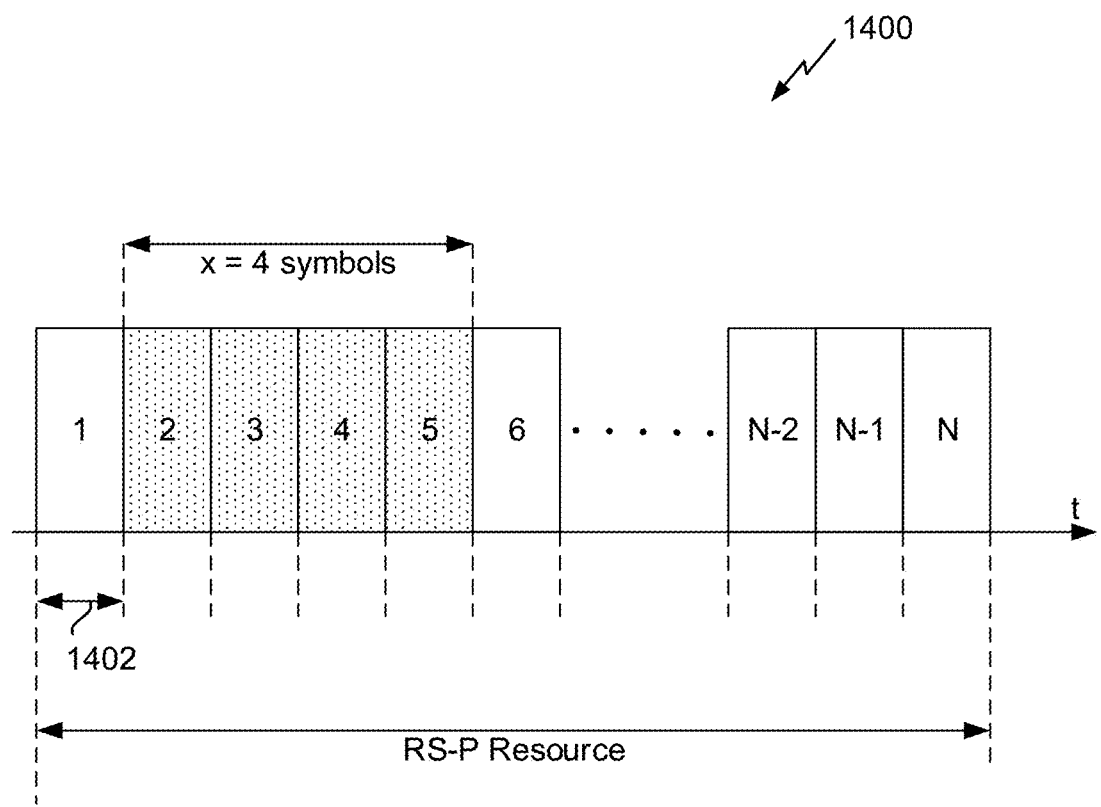
FIG. 14 illustrates an example implementation of the processes of FIGS. 11-12, respectively, in accordance with aspects of the disclosure.

FIG. 14 illustrates an example implementation 1400 of the processes 1100-1200 of FIGS. 11-12, respectively, in accordance with aspects of the disclosure. In FIG. 14, an RS-P resource (e.g., DL-PRS resource, UL-SRS-P resource, sidelink PRS resource, etc.) including symbols 1. . . N is depicted, each with symbol duration 1402. In FIG. 14, the first subset of symbols includes two or more contiguous symbols (i.e., symbols 2-5) that begin at a starting symbol (i.e., symbol 2) that is later than an initial symbol (i.e., symbol 1) of the RS-P resource. For example, for a comb-n PRS/SRS resource, UE/gNB could make an additional measurement on x (x<n) PRS/SRS symbol(s) within the resource, where x is not the initial (or first) of the PRS/SRS symbol(s).

Referring to FIGS. 11-12, in some designs, the wireless node further performs a full measurement of the first measurement type of the RS-P resource, the full measurement being measured across all symbols of the RS-P resource. In some designs, the measurement report at 1120 or 1210 includes indications of both the first partial measurement and the full measurement. In other words, an additional report element in the legacy positioning measurement report. For example, the same measurement type (i.e., for partial and full measurement) is assumed. For example, in case of RSTD for the full measurement, the first partial measurement may be RSTD. In another example, in case of Rx-Tx time difference for the full measurement, the first partial measurement may be Rx-Tx time difference. In other designs, indications of the first partial measurement and the full measurement are communicated via separate measurement reports. In other words, a new additional measurement report may be defined based on the first partial PRS/SRS measurement. Like the legacy measurement report, this additional measurement report could include the TRP ID, resource ID and time stamp. The communications device (e.g., location server) could associate these two measurement reports based on these information. In some designs, there may be an additional flag to indicate that this new 'partial' measurement report is based on the x PRS/SRS symbols (e.g., the first x symbols or some contiguous group of x symbols after the initial symbol of RS-P resource). In an example, the partial measurement report may include "x" to indicate, which symbol(s) are used to derive the additional measurement. In some designs, the partial measurement report may add additional measurement types (elements) to support advanced attack detection, such as the PRS/SRS power delay profile (PDP), etc.

Referring to FIGS. 11-12, in some designs, the wireless node further performs a second partial measurement of the first measurement type of the RS-P, the second partial measurement being measured across a second subset of the multiple symbols, the second subset of symbols being different than the first subset of symbols. For example, the first partial measurement may be measured across symbols 0-4 as in FIG. 13, while the second partial measurement may be measured across symbols 1-5 as in FIG. 14. In some designs, a number of the first subset of symbols is the same as a number of the second subset of symbols (e.g., 4 symbols, as in the examples of FIGS. 13-14). In other designs, a number of the first subset of symbols is different than a number of the second subset of symbols. In some designs, the measurement report at 1120 or 1210 includes indications of both the first partial measurement and the second partial measurement. In other designs, indications of the first partial measurement and the second partial measurement are communicated via separate measurement reports.

Referring to FIGS. 11-12, in some designs, the wireless node itself may determine whether a spoofing attack is associated with the RS-P based at least in part upon the first partial measurement. In other designs, the wireless node may transmit the measurement report without performing its own analysis as to whether spoofing has been attempted by an attacker (e.g., the communications device may perform the analysis via crowdsourcing of information across multiple measurement reports, etc.). In some designs, the wireless node and/or the communications device at 1220 may detect whether there is a potential attack based on the comparison between the measurement on the first partial PRS/SRS and the full PRS/SRS measurement. For example, if the measurement based on partial PRS/SRS is inconsistent with the measurement based on full PRS/SRS, a potential attack may be detected. In some designs, to lower the false alarm rate, the attack detection may be based on some advanced algorithms, such as machine learning. To support such advanced attack detection, the additional partial measurement(s) could be reported to the communications device (e.g., location server).

Referring to FIGS. 11-12, in some designs, the wireless node may perform at least one additional partial measurement of a second measurement type of the RS-P resource, the at least one additional partial measurement being measured across at least one subset of symbols of the multiple symbols, and may further transmit at least one additional measurement report that includes at least one additional indication of the at least one additional partial measurement.

Referring to FIGS. 11-12, in some designs, partial measurements of the first measurement type may be performed for multiple RS-Ps, and the reporting of the partial measurements may be performed for less than all of the RS-Ps. For example, in some designs, the additional report on partial PRS/SRS measurement may be sparse compared with the regular PRS/SRS (e.g., full RS-P measurements) to save UE power. To this end, in some designs, the reporting of the partial measurements may be performed periodically, aperiodically, or semi-periodically.

Referring to FIGS. 11-12, in some designs, the measurement report is communicated from the wireless node to the communications device in response to an on-demand request (e.g., requested by UE for UE-based positioning, or requested by LMF, etc.). In some designs, the on-demand request is configured to request a single partial measurement indication or multiple partial measurement indications. In some designs, the on-demand request specifies a number of the first subset of symbols, a starting symbol of the first subset of symbols, or a combination thereof. In some designs, the on-demand request may be based on an advanced attack detection algorithm running on the communications device (e.g., location server or UE) with large number of partial/full PRS/SRS measurements (e.g., a particular on-demand request for partial SRS/PRS measurement to check for potential spoofing attack may be based on crowdsource analysis that indicates that a spoofing attack is likely). In some designs, the measurement report includes an indication of the first subset of symbols (e.g., symbols 0-4 in case of FIG. 13, symbols 1-5 in case of FIG. 14, etc.),In some designs, the first measurement type corresponds to a reference signal time difference (RSTD) measurement or a receive-transmit (Rx-Tx) time difference.

Referring to FIGS. 11-12, in some designs, the wireless node corresponds to a base station or a user equipment (UE). In some designs, the RS-P corresponds to a downlink positioning reference signal (DL-PRS), an uplink sounding reference signal for positioning (UL-SRS-P) or a sidelink PRS (SL-PRS).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a wireless node, comprising: performing a first partial measurement of a first measurement type of a reference signal for positioning (RS-P) resource that includes multiple symbols, the first partial measurement being measured across a first subset of the multiple symbols; and transmitting a measurement report that includes an indication of the first partial measurement.

Clause 2. The method of clause 1, wherein the first subset of symbols includes two or more contiguous symbols that begin at an initial symbol of the RS-P resource.

Clause 3. The method of any of clauses 1 to 2, further comprising: performing a full measurement of the first measurement type of the RS-P resource, the full measurement being measured across all symbols of the RS-P resource.

Clause 4. The method of clause 3, wherein the measurement report includes indications of both the first partial measurement and the full measurement.

Clause 5. The method of any of clauses 3 to 4, wherein indications of the first partial measurement and the full measurement are transmitted via separate measurement reports.

Clause 6. The method of any of clauses 1 to 5, wherein the first subset of symbols includes two or more contiguous symbols that begin at a starting symbol that is later than an initial symbol of the RS-P resource.

Clause 7. The method of any of clauses 1 to 6, further comprising: performing a second partial measurement of the first measurement type of the RS-P, the second partial measurement being measured across a second subset of the multiple symbols, the second subset of symbols being different than the first subset of symbols.

Clause 8. The method of clause 7, wherein a number of the first subset of symbols is the same as a number of the second subset of symbols.

Clause 9. The method of any of clauses 7 to 8, wherein a number of the first subset of symbols is different than a number of the second subset of symbols.

Clause 10. The method of any of clauses 7 to 9, wherein the measurement report includes indications of both the first partial measurement and the second partial measurement.

Clause 11. The method of any of clauses 7 to 10, wherein indications of the first partial measurement and the second partial measurement are transmitted via separate measurement reports.

Clause 12. The method of any of clauses 1 to 11, further comprising: determining whether a spoofing attack is associated with the RS-P based at least in part upon the first partial measurement.

Clause 13. The method of any of clauses 1 to 12, further comprising: performing at least one additional partial measurement of a second measurement type of the RS-P resource, the at least one additional partial measurement being measured across at least one subset of symbols of the multiple symbols; and transmitting at least one additional measurement report that includes at least one additional indication of the at least one additional partial measurement.

Clause 14. The method of any of clauses 1 to 13, wherein partial measurements of the first measurement type are performed for multiple RS-Ps, and wherein reporting of the partial measurements is performed for less than all of the RS-Ps.

Clause 15. The method of clause 14, wherein the reporting of the partial measurements is performed periodically, aperiodically, or semi-periodically.

Clause 16. The method of any of clauses 1 to 15, wherein the measurement report is transmitted in response to an on-demand request.

Clause 17. The method of clause 16, wherein the on-demand request is configured to request a single partial measurement indication or multiple partial measurement indications.

Clause 18. The method of any of clauses 16 to 17, wherein the on-demand request specifies a number of the first subset of symbols, a starting symbol of the first subset of symbols, or a combination thereof.

Clause 19. The method of any of clauses 1 to 18, wherein the measurement report includes an indication of the first subset of symbols.

Clause 20. The method of any of clauses 1 to 19, wherein the first measurement type corresponds to a reference signal time difference (RSTD) measurement or a receive-transmit (Rx-Tx) time difference.

Clause 21. The method of any of clauses 1 to 20, wherein the wireless node corresponds to a base station or a user equipment (UE).

Clause 22. The method of any of clauses 1 to 21, wherein the RS-P corresponds to a downlink positioning reference signal (DL-PRS), an uplink sounding reference signal for positioning (UL-SRS-P) or a sidelink PRS (SL-PRS).

Clause 23. A method of operating a communications device, comprising: receiving, from a wireless node, a measurement report that includes an indication of a first partial measurement of a first measurement type of a reference signal for positioning (RS-P) resource that includes multiple symbols, the first partial measurement being measured by the wireless node across a first subset of the multiple symbols; and determining whether a spoofing attack is associated with the RS-P based at least in part upon the measurement report.

Clause 24. The method of clause 23, wherein the first subset of symbols includes two or more contiguous symbols that begin at an initial symbol of the RS-P resource.

Clause 25. The method of any of clauses 23 to 24, wherein the measurement report or a separate measurement report includes a full measurement of the first measurement type of the RS-P resource, the full measurement being measured by the wireless node across all symbols of the RS-P resource.

Clause 26. The method of clause 25, wherein the measurement report includes indications of both the first partial measurement and the full measurement.

Clause 27. The method of any of clauses 25 to 26, wherein indications of the first partial measurement and the full measurement are received via the measurement report and the separate measurement report, respectively.

Clause 28. The method of any of clauses 23 to 27, wherein the first subset of symbols includes two or more contiguous symbols that begin at a starting symbol that is later than an initial symbol of the RS-P resource.

Clause 29. The method of any of clauses 23 to 28, wherein the measurement report or a separate measurement report includes an indication of a second partial measurement of the first measurement type of the RS-P, the second partial measurement being measured across a second subset of the multiple symbols, the second subset of symbols being different than the first subset of symbols.

Clause 30. The method of clause 29, wherein a number of the first subset of symbols is the same as a number of the second subset of symbols.

Clause 31. The method of any of clauses 29 to 30, wherein a number of the first subset of symbols is different than a number of the second subset of symbols.

Clause 32. The method of any of clauses 29 to 31, wherein the measurement report includes indications of both the first partial measurement and the second partial measurement.

Clause 33. The method of any of clauses 29 to 32, wherein indications of the first partial measurement and the second partial measurement are received via the measurement report and the separate measurement report, respectively.

Clause 34. The method of any of clauses 23 to 33, further comprising: receiving at least one additional measurement report comprising at least one additional indication of at least one additional partial measurement of a second measurement type of the RS-P resource, the at least one additional partial measurement being measured by the wireless node across at least one subset of symbols of the multiple symbols.

Clause 35. The method of any of clauses 23 to 34, wherein partial measurements of the first measurement type are performed by the wireless node for multiple RS-Ps, and wherein reporting of the partial measurements is performed for less than all of the RS-Ps.

Clause 36. The method of clause 35, wherein the reporting of the partial measurements is performed periodically, aperiodically, or semi-periodically.

Clause 37. The method of any of clauses 23 to 36, wherein the measurement report is received in response to an on-demand request.

Clause 38. The method of clause 37, wherein the on-demand request is configured to request a single partial measurement indication or multiple partial measurement indications.

Clause 39. The method of clause 38, wherein the on-demand request specifies a number of the first subset of symbols, a starting symbol of the first subset of symbols, or a combination thereof.

Clause 40. The method of any of clauses 23 to 39, wherein the measurement report includes an indication of the first subset of symbols.

Clause 41. The method of any of clauses 23 to 40, wherein the first measurement type corresponds to a reference signal time difference (RSTD) measurement or a receive-transmit (Rx-Tx) time difference.

Clause 42. The method of any of clauses 23 to 41, wherein the wireless node corresponds to a base station or a user equipment (UE).

Clause 43. The method of any of clauses 23 to 42, wherein the RS-P corresponds to a downlink positioning reference signal (DL-PRS), an uplink sounding reference signal for positioning (UL-SRS-P) or a sidelink PRS (SL-PRS).

Clause 44. An apparatus comprising a memory, a communication interface, and at least one processor communicatively coupled to the memory and the communication interface, the memory, the communication interface, and the at least one processor configured to perform a method according to any of clauses 1 to 43.

Clause 45. An apparatus comprising means for performing a method according to any of clauses 1 to 43.

Clause 46. A non-transitory computer-readable medium storing computer-executable instructions, the computer-executable comprising at least one instruction for causing a computer or processor to perform a method according to any of clauses 1 to 43.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a wireless node, comprising:
performing a first partial measurement of a first measurement type of a reference signal for positioning (RS-P) resource, wherein the RS-P resource comprises a plurality of symbols within a slot in a time domain, wherein the RS-P resource has a PRS resource ID and the PRS resource ID is associated with a single beam transmitted from a single TRP, wherein the first partial measurement being measured across a first subset of the plurality of symbols of the RS-P resource; and
transmitting a measurement report that includes an indication of the first partial measurement.

2. The method of claim 1, wherein the first subset of symbols includes two or more contiguous symbols that begin at an initial symbol of the RS-P resource.

3. The method of claim 1, further comprising:
performing a full measurement of the first measurement type of the RS-P resource, the full measurement being measured across all symbols of the RS-P resource.

4. The method of claim 3, wherein the measurement report includes indications of both the first partial measurement and the full measurement.

5. The method of claim 3, wherein indications of the first partial measurement and the full measurement are transmitted via separate measurement reports.

6. The method of claim 1, wherein the first subset of symbols includes two or more contiguous symbols that begin at a starting symbol that is later than an initial symbol of the RS-P resource.

7. The method of claim 1, further comprising:
performing a second partial measurement of the first measurement type of the RS-P, the second partial measurement being measured across a second subset of the plurality of symbols of the RS-P resource, the second subset of symbols being different than the first subset of symbols.

8. The method of claim 7, wherein a number of the first subset of symbols is the same as a number of the second subset of symbols.

9. The method of claim 7, wherein a number of the first subset of symbols is different than a number of the second subset of symbols.

10. The method of claim 7, wherein the measurement report includes indications of both the first partial measurement and the second partial measurement.

11. The method of claim 7, wherein indications of the first partial measurement and the second partial measurement are transmitted via separate measurement reports.

12. The method of claim 1, further comprising:
determining whether a spoofing attack is associated with the RS-P based at least in part upon the first partial measurement.

13. The method of claim 1, further comprising:
performing at least one additional partial measurement of a second measurement type of the RS-P resource, the at least one additional partial measurement being measured across at least one subset of symbols of the plurality of symbols of the RS-P resource; and
transmitting at least one additional measurement report that includes at least one additional indication of the at least one additional partial measurement.

14. The method of claim 1,
wherein partial measurements of the first measurement type are performed for multiple RS-Ps, and
wherein reporting of the partial measurements is performed for less than all of the RS-Ps.

15. The method of claim 14, wherein the reporting of the partial measurements is performed periodically, aperiodically, or semi-periodically.

16. The method of claim 1, wherein the measurement report is transmitted in response to an on-demand request.

17. The method of claim 16, wherein the on-demand request is configured to request a single partial measurement indication or multiple partial measurement indications.

18. The method of claim 16, wherein the on-demand request specifies a number of the first subset of symbols, a starting symbol of the first subset of symbols, or a combination thereof.

19. The method of claim 1, wherein the measurement report includes an indication of the first subset of symbols.

20. The method of claim 1, wherein the first measurement type corresponds to a reference signal time difference (RSTD) measurement or a receive-transmit (Rx-Tx) time difference.

21. A method of operating a communications device, comprising:
receiving, from a wireless node, a measurement report that includes an indication of a first partial measurement of a first measurement type of a reference signal for positioning (RS-P) resource, wherein the RS-P resource comprises a plurality of symbols within a slot in a time domain, wherein the RS-P resource has a PRS resource ID and the PRS resource ID is associated with a single beam transmitted from a single TRP, wherein the first partial measurement being measured by the wireless node across a first subset of the plurality of symbols of the RS-P resource; and
determining whether a spoofing attack is associated with the RS-P based at least in part upon measurement information included in the measurement report.

22. The method of claim 21, wherein the first subset of symbols includes two or more contiguous symbols that begin at an initial symbol of the RS-P resource.

23. The method of claim 21, wherein the measurement report or a separate measurement report includes a full measurement of the first measurement type of the RS-P resource, the full measurement being measured by the wireless node across all symbols of the RS-P resource.

24. The method of claim 21, wherein the first subset of symbols includes two or more contiguous symbols that begin at a starting symbol that is later than an initial symbol of the RS-P resource.

25. The method of claim 21, wherein the measurement report or a separate measurement report includes an indication of a second partial measurement of the first measurement type of the RS-P, the second partial measurement being measured across a second subset of the plurality of symbols of the RS-P resource, the second subset of symbols being different than the first subset of symbols.

26. The method of claim 21, further comprising:
receiving at least one additional measurement report comprising at least one additional indication of at least one additional partial measurement of a second measurement type of the RS-P resource, the at least one additional partial measurement being measured by the wireless node across at least one subset of symbols of the plurality of symbols of the RS-P resource.

27. The method of claim 21,
wherein partial measurements of the first measurement type are performed by the wireless node for multiple RS-Ps, and
wherein reporting of the partial measurements is performed for less than all of the RS-Ps.

28. The method of claim 21, wherein the measurement report is received in response to an on-demand request.

29. A wireless node, comprising:
a memory;
a communication interface; and
at least one processor communicatively coupled to the memory and the communication interface, the at least one processor configured to:
perform a first partial measurement of a first measurement type of a reference signal for positioning (RS-P) resource, wherein the RS-P resource comprises a plurality of symbols within a slot in a time domain, wherein the RS-P resource has a PRS resource ID and the PRS resource ID is associated with a single beam transmitted from a single TRP, wherein the first partial measurement being measured across a first subset of the plurality of symbols of the RS-P resource; and
cause the communication interface to transmit a measurement report that includes an indication of the first partial measurement.

30. A communications device, comprising:
a memory;
a communication interface; and
at least one processor communicatively coupled to the memory and the communication interface, the at least one processor configured to:
receive, via the communication interface, from a wireless node, a measurement report that includes an indication of a first partial measurement of a first measurement type of a reference signal for positioning (RS-P) resource, wherein the RS-P resource comprises a plurality of symbols within a slot in a time domain, wherein the RS-P resource has a PRS resource ID and the PRS resource ID is associated with a single beam transmitted from a single TRP, wherein the first partial measurement being measured by the wireless node across a first subset of the plurality of symbols of the RS-P resource; and
determine whether a spoofing attack is associated with the RS-P based at least in part upon measurement information included in the measurement report.

* * * * *